United States Patent [19]

Haines et al.

[11] Patent Number: 5,787,164
[45] Date of Patent: Jul. 28, 1998

[54] SWITCHED NETWORK CALL PROGRESS PROTOCOL ANALYZER

[75] Inventors: Walton P. Haines, Corralitos; Steven Waller, Santa Cruz, both of Calif.

[73] Assignee: Ellipsys Technologies, Inc., Soquel, Calif.

[21] Appl. No.: 694,433

[22] Filed: Aug. 12, 1996

[51] Int. Cl.⁶ .................................................. H04M 1/00
[52] U.S. Cl. .......................... 379/372; 379/377; 379/386; 379/376; 379/373
[58] Field of Search ..................... 379/372, 377, 379/386, 376, 374, 373, 382, 100.05, 179

[56] References Cited

U.S. PATENT DOCUMENTS

| | | | |
|---|---|---|---|
| 4,935,958 | 6/1990 | Morganstein et al. | 379/372 |
| 5,023,906 | 6/1991 | Novas | 379/372 |
| 5,448,624 | 9/1995 | Hardy et al. | 379/372 |
| 5,483,593 | 1/1996 | Gupta et al. | 379/372 |
| 5,590,182 | 12/1996 | Stevens et al. | 379/377 |

*Primary Examiner*—Dwayne D. Bost
*Assistant Examiner*—Keith Ferguson
*Attorney, Agent, or Firm*—Blakely, Sokoloff, Taylor & Zafman LLP

[57] ABSTRACT

A device capable of analyzing call progress event information from sensors connected to switched network circuits for the purpose of identifying the beginning and end of a telephone call. The invention also collects and analyzes all events occurring between the origination and termination of the call, providing a detailed description of both telephone user and network element actions. Abnormal events are identified during this analysis so that call quality can be determined. The invention can use information supplied by sensors that are intrusive or non intrusive to the switched network circuit.

8 Claims, 20 Drawing Sheets

| Msg. Type | Time(ms) | Tip to Gnd | Ring to Gnd | Tip/Ring | Current | CktID |
|---|---|---|---|---|---|---|
| VoltageMsg1<CR> | 0000.000 | 0VDC, | 48VDC, | 48VDC. | 0, | 1<CR> |
| VoltageMsg2<CR> | 0320.000 | 0VDC, | 48VDC. | 105VAC. | 0, | 1<CR> |
| VoltageMsg3<CR> | 0322.000 | 0VDC, | 48VDC, | 48VDC. | 0, | 1<CR> |
| VoltageMsg4<CR> | 0326.000 | 0VDC, | 48VDC, | 105VAC. | 0, | 1<CR> |
| VoltageMsg5<CR> | 0328.000 | 0VDC, | 48VDC, | 48VDC. | 0, | 1<CR> |
| VoltageMsg6<CR> | 0329.455 | 20VDC, | 35VDC, | 15VDC. | 25, | 1<CR> |
| VoltageMsg7<CR> | 1565.100 | 0VDC, | 60VDC, | 60VDC. | 0, | 1<CR> |
| VoltageMsg8<CR> | 1573.235 | 0VDC, | 48VDC, | 48VDC. | 0, | 1<CR> |

FIG. 3A

| Msg Type | Time Stamp | Raw Signal | Physical Event |
|---|---|---|---|
| Voltage Msg1 | 0000.000 | ,0,48,48,0,1<CR> = | On Hook |
| Voltage Msg2 | 0320.000 | ,0,48,105,0,1>CR> = | Machine Ring On |
| Voltage Msg3 | 0322.000 | ,0,48,48,0,1 <CR> = | Machine Ring Off |
| Voltage Msg4 | 0326.000 | ,0,48,105a,0,1 <CR> = | Machine Ring On |
| Voltage Msg5 | 0328.000 | ,0,48,48,0,1 <CR> = | Machine Ring Off |
| Voltage Msg6 | 0329.455 | ,20,35,15,25,1 <CR> = | Off Hook |
| Voltage Msg7 | 1565.100 | ,0,60,60,0,1 <CR> = | Float |
| Voltage Msg8 | 1573.235 | ,0,48,48,0,1 <CR> = | On Hook |

FIG. 3B

| Message Type | Time Stamp | Raw Signal | Physical Event | State |
|---|---|---|---|---|
| | | | | Idle |
| Voltage Msg1 | 0000.000 | ,0,48,48,0,1,<CR> = | On Hook | |
| Voltage Msg2 | 0320.000 | ,0,48,105,0,1,>CR> = | Machine Ring On | Ring On |
| Voltage Msg 3 | 0322.000 | ,0,48,48,0,1 <CR> = | Machine Ring Off | Ring Off |
| Voltage Msg4 | 0326.000 | ,0,48,105a,0,1 <CR> = | Machine Ring On | Ring On |
| Voltage Msg 5 | 0328.000 | ,0,48,48,0,1 <CR> = | Machine Ring Off | Ring Off |
| Voltage Msg 6 | 0329.455 | 20,35,15,25,1 <CR> = | Off Hook | Answer |
| Off Hook Timer | 0331.455 | | | Stable Call |
| Voltage Msg 7 | 1565.100 | ,0,60,60,0,1 <CR> = | Float | Station on Hook |
| Voltage Msg8 | 1573.235 | ,0,48,48,0,1 <CR> = | On Hook | CO On Hook |

FIG. 3C

SWITCHED NETWORK CALL PROGRESS PROTOCOL ANALYZER

BACKGROUND OF THE INVENTION

1. Field of the Invention

The system of the present invention relates to the field of telephone test systems.

2. Art Background

Telephone communication has been around for over 100 years. During the evolution of telecommunication technology, a basic Call Progress Protocol (CPP) has been defined. This protocol allows manufacturers of telephone switches to design equipment that can communicate both with the end user equipment and other vendors' switching equipment. Unlike later protocols, CPP was not defined and agreed to by national and international committees. By default, AT&T had defined CPP based on their network switching requirements. These requirements exist as separate documents for each individual network element. The protocol used by a telephone is defined in one Technical Requirement (TR) whereas the complementary Line Circuit protocol is defined in a different TR.

As a result, switch and equipment manufacturers designed equipment based on their understanding of the protocol. This situation has caused many compatibility problems over the years. Subscriber telephone equipment that worked at one location did not always work the same when they moved it to another location served by a different vendor's switch. Testing these troubles became difficult requiring complicated test equipment such as oscilloscopes and strip chart recorders. To complicate matters, the same vendor will often change its original implementation of CPP in newer switches because new technologies are available that provide faster or more efficient use of switch resources. On occasion, Public Branch Exchanges (PBX) equipment will not work at all when a new switch is installed. Special protocol converters are sometimes required to enable embedded terminal equipment to function properly. These compatibility problems have resulted in excessive down time and cost subscribers and switch manufacturers considerable money to correct.

The evolution of network switches and terminal equipment has created an additional problem. Network switches and terminal equipment have evolved into computer controlled devices. The computers are capable of providing new kinds of services that were impossible to implement in the older electromechanical switches. Services, such as Call Forwarding, 3-Way Calling, Caller ID, Call Waiting and Voice Mail have added new processes to the CPP. These new processes are considerably more complicated than the original CPP implementation. More than ever, users can experience problems depending on how they use their phone. The new Advanced Intelligent Network (AIN) services provided by AT&T will complicate this problem. AIN adds functionality by incorporating a separate computer to provide new service offerings. The network switch only handles part of the call; the AIN computer handles the rest. AIN is an evolving service platform that will only get more complicated as time goes on.

Lastly, telephone companies, network switch manufacturers and terminal equipment vendors are all downsizing their work force. Experienced maintenance personnel are leaving these companies causing a considerable knowledge gap. Companies are looking to automated test systems and expert systems to fill this knowledge gap. Unfortunately, these systems are not able to keep up with the rapid development of new services and switching technologies.

SUMMARY OF THE INVENTION

An innovative test system for determining and monitoring the status of a call is provided. The test system detects the protocol which occurs between two or more network elements of the circuit. The test system includes at least one sensor connected to telecommunication circuits to sense raw call progress signaling information indicative of an event relative to the call on the monitored line. The sensor is connected to a call processing system that includes a processor wrapper and a call progress state machine. The raw call progress signaling information is forwarded to a call processor wrapper which includes a call progress event processor that converts the raw call progress signaling information into standardized call progress event indicators for subsequent processing by the system. The call processor wrapper further calls a timer processor which calculates the elapsed time from the previous call progress event, and determines if any other timer(s) previously set by the call progress state machine has expired. These timers are used to determine the wait for an expected call progress event (e.g., dial tone should be detected within 4 seconds after an off hook event is detected) or validate the duration of a call progress event (e.g., DTMF digits should remain on for at least 50 ms to be valid).

The timer processor selects the most recent event in time, e.g., expired timer or call progress event, and clocks the call progress state machine. When clocked, the call progress state machine analyzes the event and current call status indicators, provided by a call status handler located in the call processor wrapper. The call status handler is used to track the current status of the call, e.g., dial tone received, the call is an originating call, circuit is off hook, etc. The call progress state machine either transitions to a new state or remains in the current state. If it transitions to a new state, the call progress state machine updates the call status handler with the new status information, updates a state tracker processor of the wrapper with the new state and informs the timer processor that the state machine has completed the current cycle. If the call progress state machine did not transition to a new state, it informs the timer process that it has completed the current cycle without altering the contents of the call status handler state tracker. This process is performed for the call progress event and each expired timer identified by the timer processor.

The call processor wrapper and the call progress state machine then waits for the next event to occur. If the call progress state machine determines the latest event is the termination of the call, it informs the call processor wrapper of the end of the call events. The call processor wrapper then informs external devices that a completed call scenario has been detected and passes all appropriate information to it for subsequent processing or analysis. This enables all call progress events associated with a call to be available to external devices and network maintenance personnel.

This system therefore can monitor status of calls originating from a variety of lines and devices such as a public branch exchange (PBX), trunk line or simple loop lines. Furthermore, as the call progress state machine enables efficient use of computer resources, supplemented by the call progress wrapper that provides the state machine with memory access and data manipulation capabilities, programmable timer(s) access and event decoding, real time call progress analysis can be achieved using relatively low cost personal computers. In addition, as the call progress wrapper provides the state machine the functionality that would typically be performed using expensive hardware (e.g., random access memory, status registers, timer circuits, etc.) and affords flexibility by enabling timers and memory to be created or allocated dynamically through software control functions.

BRIEF DESCRIPTION OF THE DRAWINGS

The objects, features and advantages of the present invention will be apparent to one skilled in the art from the following detailed description in which:

FIGS. 3a, 3b and 3c illustrate the the type of information processed.

DEFINITIONS

Notable States

Figure 1:
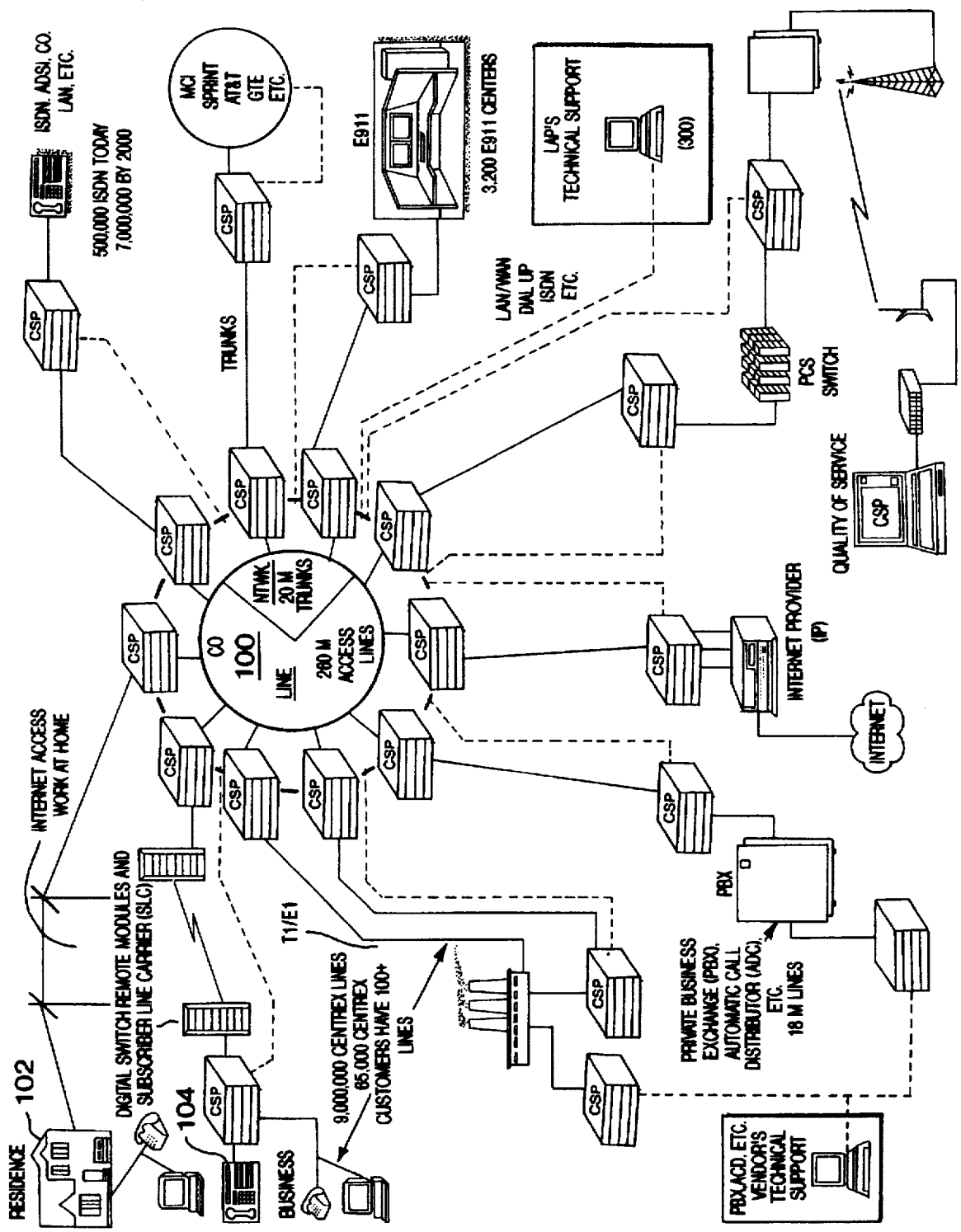
FIG. 1 illustrates the use of the test system of the present invention in a variety of telephony environments.

| | |
|---|---|
| Ns3WCall | Three way call |
| NsAbandon | No user action |
| NsAudRing | Audible Ringing |
| NsAudRngOff | Audible Ringing Off |
| NsAudRngOn | Audible Ringing On |
| NsBsyCall | Busy Call |
| NsCallAbandon | Call Abandon |
| NsCallAns | Call Answered |
| NsCallingPtyHld | Calling Party Hold |
| NsCircuitOpen | Open Line |
| NsCoOfh | Central Office Off Hook |
| NsCoOnh | Central Office On Hook |
| NsCW | Call Waiting |
| NsDialing | Dialing |
| NsDrop3W | Drop Three way call |
| NsDT | Dial Tone |
| NsDTdly | Dial Tone delay |
| NsDThit | Dial Tone hit |
| NsEndFlash | End Flash |
| NsFastDialDT | Fast Dial No Dial Tone |
| NsFeaCall | Feature type Call |
| NsFlsh | Flash on line |
| NsIdle | Idle line |
| NsIncompleteCall | Imncomplete Call |
| NsLineTest | Central Office Line Test |
| NsLodi | Process Manually |
| NsNoDialTone | No Dial Tone |
| NsNoDigits | No Digits |
| NsMsgDT | Message waiting Dial Tone |
| NsOfh | Off Hook |
| NsOnh | On Hook |
| NsOpn | Open |
| NspermSignal | Permanent Signal |
| NsPSoffHook | Permanent Signal Off Hook |
| NsRclDT | Recall Dial Tone |
| NsReOrder | Reorder |
| NsRngOff | Ringing Off |
| NsRngOn | Ringing On |
| NsRngOSI | Ringing Open Switch Interval |
| NsShrtAns | Short Answer |
| NsShortCall | Short Call |
| NsSpeech | False Call progress Tone Identified |
| NsStb | Stable Call |
| NsStbDig | Stable Digit |

DEFINITIONS (continued)

Transition Reasons

| | |
|---|---|
| A_B_C_Talking | Feature three way call connected |
| 2DTMFoffs | Second DTMF Off |
| Abandon | Abandon |
| BptyOnHold | "B" Party On Hold Feature Call State |
| CallAbandoned | Call Abandoned |
| CallingPtyHld | Calling Party Hold |
| DialingO | Dialing over |
| DiaiTone | DialTone |
| DigOffnoOn | Digit Off Without Digit On |
| DigLT50ms | Digit less than 50 ms |
| Dtdetected | Dial Tone detected |
| Dtoff | Dial Tone Off |
| LineNormal | Line Normal |
| LineOffHook | Line Off Hook |
| LineOnHook | Line On Hook |
| LineOpen2secs | Line Open for 2 Seconds |
| LineTest | Central Office Line Test |
| NoDT4secs | No Dial Tone for 4 Seconds |
| Openfor500ms | Open line for 500 milliseconds |
| Openfor10secs | Open line for 10 Seconds |
| PreTripped | Line trips Ringing before answer |
| RingNoAnswer | Ringing without answer |
| RingStopped | Ringing tripped |

Call Count Block

| | |
|---|---|
| CcbAudRng | Audible Ring(s) |
| CcbBsyDig | Digit(s) During Busy |
| CcbCW | Call Waiting Tones |
| CcbDig | Digit(s) |
| CcbDPpls | Dial Pulse(s) |
| CcbFlsh | Flash(es) |
| CcbRng | Machine Ring(s) |
| CcbROdig | Digit(s) During Reorder |
| CcbStbDig | Digit(s) During Talk Interval |

Call Dispositions

| | |
|---|---|
| Cd3W | Three Way Call |
| CdAnsCall | Call Answered |
| CdBsy | Busy |
| CdCW | Call Waiting |
| CdDPdig | Dial Pulse Digit |
| CdDT2 | Second Dial Tone |
| dLodi | Process Manually |
| CdMsgWtDT | Message Waiting |
| CdOrg | Originating Call |
| CdOrgCallAbdn | Originating Call Abandon |
| CdOSI | Open Switch Interval (OSI) |
| CdRingNoAns | Unanswered Mach. Ringing |
| CdTalk | Completed Call |
| CdTerm | Terminating |
| CallCdTermCall | Terminating |
| CallAbandonCdTermCallAbdn | Terminating |

Call Network Trouble

| | |
|---|---|
| CntDTdly | Dial Tone Delay |
| CntNoDialTone | No Dial Tone |
| CntNoSync | Circuit Open |
| CntRO | Reorder |

Call Network Unusual

| | |
|---|---|
| CnuCktOpen | Circuit Open |
| CnuCWosi | Call Waiting OSI |
| CnuDThit | Dial Tone Hit |
| CnuHit | Hit |
| CnuPreTrp | Pre Trip (Answer) |
| CnuTmDisc | imed Disconnect |

Call Station Trouble

| | |
|---|---|
| CstErrBsyDig | Error Digit during Busy |
| CstErrDropOff | Error Drop Off |
| CstLnPS | Line Permanent Signal |
| CstLongDig | Long Digit |
| CstPreTrp | Pre Trip. (Answer) |
| CstROdig | Digit over Reorder |
| CstShrtDig | Short Digit |

5,787,164

DEFINITIONS

Call Station Unusual

| | |
|---|---|
| CsuBsyDig | Digit during Busy |
| CsuDTtimeout | Dial Tone Timeout |
| CsuEndFlsh | End Flash |
| CsuFastDial | Fast Dial |
| CsuOrgCallAbdn | Originating Call Abandon |
| CsuRclDT | Recall Dial Tone |
| CsuShrtAns | Short Answer |
| CsuStaDisc | Station Disconnect |

Line Count Block

| | |
|---|---|
| lcb3W | (3) Three Way Call |
| lcbAnsCall | Call Answered |
| lcbCallNum | Call Count |
| lcbDTdly | Dial Tone Delay |
| lcbErrDig | Digit Error |
| lcbLodi | Analyze Manually |
| lcbNoDT | No Dial Tone |
| lcbOrgAbdn | Origination Abandon |
| lcbOrgCall | Originating Call |
| lcbOrgCallAbdn | Originating Call Abandon |
| lcbSeize | Seize |
| lcbShrtAns | Short Answer |
| lcbTerm | Terminating |
| lcbTermCall | Terminating Calls |
| lcbTermCallAbdn | Terminating Call Abandon |

States

| | |
|---|---|
| 3W | Three way call |
| 3WstbCall | Three way Call Stable Call |
| Abdn | Abandon |
| AddOnCall | Add OnCall |
| Ans | Answer |
| AudRngOff | Audible Ringing Off |
| AudRngOn | Audible Ringing On |
| BadDPdig | Bad Dial Pulse Digit |
| BptyHld | "B" Party Hold |
| Bsy | Busy |
| BsyDig | Digit over busy signal |
| BsyROoff | Busy/Reorder off |
| BsyROon | Busy/Reorder on |
| BsyROon2 | Busy/Reorder on second cycle |
| BsyUnk | Busy Unknown |
| CallAbdn | Call Abandon |
| CallHold | Call Hold |
| CallOnHld | Call on Hold |
| CallOver | Call Complete |
| ChkBnchMrk | Check Bench Mark |
| ChkDP | Check Dial Pulse |
| ChkDTa | Check Dial Tone a |
| ChkDTb | Check Dial Tone b |
| ChkFlsh | Check Flash |
| CoOfh | Central Office Off Hook |
| CoOnh | Central OfficeOn Hook |
| CptyHld | "C" Party Hold |
| CW | Call Waiting |
| Cwabdn | Call Waiting Abandon |
| DetRngOff | Detect Ringing Off |
| DetRngOn | Detect Ringing On |
| DigErr | Digit Error |
| Disc3W | Disconnect three Way |
| Dpdig | Dial Pulse Digit |
| DPplsBrk | Dial Pulse Break |
| DPplsMk | Dial PulseMake |
| Drop3W | Drop three way |
| DT | Dial Tone |
| DTbkA | Dial Tone back A |
| DTbkB | Dial Tone back B |
| DTbkC | Dial Tone back C |
| Dtoff | Dial Tone off |
| DToffDP | Dial Tone on Dial Pulse |
| Dtdly | Dial Tone Delay |
| DTMFdig | Dual Tone Multiple Frequency digit |
| DTMFoff | Dual Tone Multiple Frequency off |
| EndFlsh | End Flash |
| ErrBsyOff | Error Busy Off |
| ErrorSz | Error Seizure |
| FastDial | Fast Dial |
| Float | Float voltage |
| HitOrFlshTmr | Hit or Flash timer |
| HitTmr | Hit Timer |
| Idle | Idle |
| Idle2 | idle 2 |
| IsFlsh | Is Flash |
| LnClose | Line Close |
| LnTest | Central Office Line test |
| Lodl | Undefined state Process Manually |
| LongDig | Long Digit |
| MissDt | Missing Digit |
| MoreDig | More Digit |
| MsgWaitDT | Message waiting dial tone |
| NetHld | Network Hold |
| No3W | No three way |
| NoDig | No digit |
| NoDT | No dial Tone |
| NoSync | No Synchronization |
| OkFlsh | OK Flash |
| OnHook | On Hook |
| Opn | Open |
| OSI | Open Switch Interval |
| PermSigRing | Permanent Signal Ringing |
| Psofh | Permanent Signal off hook |
| Psopen | Permanent Signal open |
| PSUopen | Phone Service Unit open |
| RclDT | Recall Dial Tone |
| RclOff | Recall Off |
| RclOn | Recall On |
| RealHit | Real Hit |
| RngOSI | Ringing Open Switch Interval |
| RO | ReOrder |
| Rodig | ReOrder digit detection |
| SamePSU | Same Phone Service Unit |
| ShrtAns | Short Answer |
| ShrtDig | Short Digit |
| StbCall | Stable Call |
| StbDig | Stable Digit |
| Sz | Seizure |
| TalkOn | Talk On |
| ToneOn | Tone On |
| ValidDig | Valid Digit |
| Unknown | Unknown |

Status

| | |
|---|---|
| 2DTMFoffs | Dual Tone Multiple Frequency |
| 3W | Three Way call |
| 5E | 5ESS Switch |
| BptyHld | "B" Party Hold |
| BptyHld3W | "B" Party Hold three way call |
| CallHold | Call Hold |
| CptyHld | "C" Party Hold |
| CurEqOfh | Current Equal off hook |
| CurEqOnh | Current Equal On hook |
| CurAvailable | Current Available |
| CurRelayClosed | Current Relay Closed |
| CW | Call Waiting |
| Cwabdn | Call Waiting Abandon |
| DigOn | Digit On |
| Dpdig | Dial Pulse digit |
| DPOff | Dial Pulse Off |
| Dtbk | Dial Tone break (Stutter) |
| ErrDigOff | Error Digit Off |
| ErrDigOn | Error Digit On |
| ErrLodi | Error Undefined state Process Manually |
| ErrSz | Error Seizure |
| FarEndAns | Far End Answer |
| FeaCall | Feature Call |
| Float | Float voltage |
| LnOpen | Line Open |
| Lodi | Undefined state Process Manually |
| LongOpen | Long Open |
| Offhook | Off Hook |
| OnHook | On Hook |
| Org | Originating |
| PDdigOff | Dial Pulse digit Off |
| RngEqOfh | Ring Equals Off Hook |

5,787,164

-continued

DEFINITIONS

| | |
|---|---|
| RngEqOnh | Ring Equals On Hook |
| RngGtOfh | Ring Equals Greater than Off Hook |
| RngGtOnh | Ring Equals Greater than On Hook |
| RngLtOfh | Ring Equals Less Than Off Hook |
| RngLtOnh | Ring Equals Less Than On Hook |
| SzOSI | Seizure |
| Term | Terminating |
| TermCall | Terminating Call |
| Test | Central Office test |
| TipEqOfh | Tip Equals Off Hook |
| TipEqOnh | Tip Equals On Hook |
| TipGtOfh | Tip Equals Greater than Off Hook |
| TipGtOnh | Tip Equals Greater than |
| TipLtOfh | Tip Equals Less Than Off Hook |
| TipLtOnh | Tip Equals Less |
| VcUnchanged | Voltage Unchanged |
| VoltEqOfh | Voltage Equals Off Hook |
| VoltEqOnh | Voltage Equals On Hook |
| Non-Voltage Event Status | |
| bStsTimeHrt | heartbeat time condition |
| bStsTimeTmr | timer condition |
| bStsTimeFilt | filtered time condition |
| bStsCPTa | CPT tone(s) has just finished |
| bStsCPTb | CPT tone 350 Hz |
| bStsCPTc | CPT tones 350 + 440 Hz |
| bStsCPTd | CPT tones 440 + 480 Hz |
| bStsCPTe | CPT tone 480 Hz |
| bStsCPTf | CPT tones 350 + 480 Hz |
| bStsCPTg | CPT tones 440 + 480 Hz |
| bStsCPTh | CPT tones 350 + 440 + 480 Hz |
| bStsCPTi | CPT tone 620 Hz |
| bStsCPTj | CPT tones 350 + 620 Hz |
| bStsCPTk | CPT tones 440 + 620 Hz |
| bStsCPTl | CPT tones 350 + 440 + 620 Hz |
| bStsCPTm | CPT tones 480 + 620 Hz |
| bStsCPTn | CPT tones 350 + 480 + 620 Hz |
| bStsCPTo | CPT tones 440 + 480 + 620 Hz |
| bStsCPTp | CPT tones 350 + 440 + 480 + 620 Hz |
| evDTMF - Dual Tone Multiple Frequency event conditions | |
| bStsDTMFone | DTMF digit one 697 + 1209 Hz |
| bStsDTMFfour | DTMF digit four 770 + 1209 Hz |
| bStsDTMFseven | DTMF digit seven 852 + 1209 Hz |
| bStsDTMFstar | DTMF symbol * 941 + 1209 Hz |
| bStsDTMFtwo | DTMF digit two 697 + 1336 Hz |
| bStsDTMFfive | DTMF digit five 770 + 1336 Hz |
| bStsDTMFeight | DTMF digit eight 852 + 1336 Hz |
| bStsDTMFzero | DTMF digit zero 941 + 1336 Hz |
| bStsDTMFthree | DTMF digit three 697 + 1477 Hz |
| bStsDTMFsix | DTMF digit six 770 + 1477 Hz |
| bStsDTMFnine | DTMF digit nine 852 + 1477 Hz |
| bStsDTMFpound | DTMF symbol # 941 + 1477 Hz |
| bStsDTMFa | DTMF character A 697 + 1633 Hz |
| bStsDTMFb | DTMF character B 770 + 1633 Hz |
| bStsDTMFc | DTMF character C 852 + 1633 Hz |
| bStsDTMFd | DTMF character D 941 + 1633 Hz |
| bStsDTMFoff | DTMF tone(s) has just finished |
| evMF - Multiple Frequency event conditions | |
| bStsMFoff | MF tone(s) just finished |
| bStsMFone | MF digit one 700 + 900 Hz |
| bStsMFtwo | MF digit two 700 + 1100 Hz |
| bStsMFfour | MF symbol four 700 + 1300 Hz |
| bStsMFseven | MF digit seven 700 + 1500 Hz |
| bStsMFst3p | MF idicator ST3P 700 + 1700 Hz |
| bStsMFthree | MF digit three 900 + 1100 Hz |
| bStsMFfive | MF digit five 900 + 1300 Hz |
| bStsMFeight | MF digit eight 900 + 1500 Hz |
| bStsMFstp | MF indicator STP 900 + 1700 Hz |
| bStsMFsix | MF digit six 1100 + 1300 Hz |
| bStsMFnine | MF digit nine 1100 + 1500 Hz |
| bStsMFkp | MF indicator KP 1100 + 1700 Hz |
| bStsMFzero | MF digit 0 1100 + 1500 Hz |
| bStsMFst2p | MF indicator ST2P 1300 + 1700 Hz |
| bStsMFst | MF indicator ST 1500 + 1700 Hz |
| evRng | Ringing event conditions |
| bStsRngOff | Ringing has just finished |
| bStsRngOn | Ringing is in progress |
| evSIT - Special Information Tone event conditions | |
| bStsSIToff | SIT tone has just finished |
| bStsSITs1lS | SIT tone segment 1 low short duration (s1 lS) |
| bStsSITs1hS | SIT tone segment 1 high short duration (s1 hS) |
| bStsSITs2lS | SIT tone segment 2 low short duration (s2 lS) |
| bStsSITs2hS | SIT tone segment 2 high short duration (s2 hS) |
| bStsSITs3lS | SIT tone segment 3 low short duration (s3 lS) |
| bStsSITs3hS | SIT tone segment high short duration (s3 hS) |
| bStsSITnst1 | no SIT tone 1 |
| bStsSITnst2 | no SIT tone 2 |
| bStsSITs1hL | SIT tone segment 1 low long duration (s1 hL) |
| bStsSITs1lL | SIT tone segment 1 high long duration (s1 lL) |
| bStsSITs2lL | SIT tone segment 2 low long duration (s2 lL) |
| bStsSITs2hL | SIT tone segment 2 high long duration (s2 hL) |
| bStsSITs3lL | SIT tone segment 3 low long duration (s3 lL) |
| bStsSITs3hL | SIT tone segment 3 high long duration (s3 hL) |
| bStsSITnst3 | no SIT tone 3 |
| evLnCktSnsrOfl | line circuit sensor offline conditions |
| bStsLnCktSnsrOfl | the line circuit sensor has gone offline |
| evLnCktSnsrTrblBtn | line circuit sensor trouble button conditions |
| bStsSuTrblBtnOn | line circuit sensor trouble button is being pressed |
| bStsSuTrblOff | line circuit sensor trouble button just released |
| bStsCPTon | Call Progress Tone on |
| bStsDTMFon | Dual Tone Multiple Frequency on |
| bStsMFon | Multiple Frequency on |
| bstsMFdigitOn | Multiple Frequency digit On |
| bStsMFstOn | Multiple Frequency On |
| bStsSITon | Special Information Tone on |
| State Dependent Timers | |
| SdAns100 | Answer 100ms |
| SdAns4k | Answer 4000ms |
| SdAns12k | Answer 12000ms |
| SdAud5200 | Audible 5200ms |
| SdBkA200 | Break a 200ms (Stutter) |
| SdBkB200 | Break B 200ms(Stutter) |
| SdChkDT75 | Check Dial Tone 75ms |
| SdChkDT200 | Check Dial Tone 200ms |
| SdDigOff10k | Digit Off 10000ms |
| SdDP75 | Dial Pulse 75ms |
| SdDP500 | Dial Pulse 500ms500ms |
| SdDPbrk300 | Dial Pulse break 300ms |
| SdDPbrk500 | Dial Pulse break500ms |
| SdDPdig10k | Dial Pulse Digit 10000ms |
| SdDPmk300 | Dial Pulse Make 300ms |
| SdDT200 | Dial Tone 200ms |
| SdDTdly4k | Dial Tone Delay 4000ms |
| SdDTMFon4k | Dual Tone Multiple Frequency 4000ms |
| SdDTMFon50 | Dual Tone Multiple Frequency 50ms |
| SdDToff200 | Dial Tone off 200ms |
| SdEndFlsh4k | End Flash 4000ms |
| SdFlsh1k | Flash 1000ms |
| SdGoIdle1k | Go Idle 1000ms |
| SdHit400 | Hit 400ms |
| SdLnClose2k | Line Closed 2000ms |
| SdLodi2k | Undefined state 2000ms Process Manually |
| SdLodi7k | Undefined state 7000ms Process Manually |
| SdLodi15k | Undefined state 15000ms Process Manually |

DEFINITIONS

| | |
|---|---|
| SdLodi20k | Undefined state 20000ms Process Manually |
| SdNull0 | Null 10ms |
| SdOnHk200 | On Hook 200ms |
| SdOpen1k | Open 1000ms |
| SdOpen30k | Open 30000ms |
| SdOpen400 | Open 400ms |
| SdOpen500 | Open 500ms |
| SdPS2k | Permanent Signal 2000ms |
| SdPSring100 | Permanent Signal Ring 100ms |
| SdRclDT125 | Recal Dial Tone 125ms |
| SdRclOff200 | Recal Dial Tone 200ms |
| SdRclOn160 | Recal Dial Tone 160ms |
| SdRng300 | Ringing 300ms |
| SdRng5500 | Ringing 5500ms |
| SdSUOpen10k | Service Unit Open 10000ms |
| SdTermHLd2k | Term Hold 2000ms |
| SdWait250 | Wait 250ms |
| SdWait500 | Wait 500ms |
| State Independent Timers | |
| SiBsyRO300 | Busy/Reorder 300ms |
| SiCW12k | Call Waiting 12000ms |
| SiOffHk4k | Off Hook 4000ms |
| SiOnHk12k | On Hook 12000ms |
| SiOnHk1500 | On Hook 1500ms |
| Event Filter | |
| EvCPTall | Call Progress Tone all |
| EvDTMFall | Dual Tone Multiple Frequency all |
| EvMFall | Multiple Frequency |
| Event Pass | |
| CPTc100 | Call Progress Tone |
| CPTd | Call Progress Tone Dial Tone |
| CPTd100 | Call Progress Tone Dial Tone 100ms |
| CPTd2k | Call Progress Tone Dial Tone 2000ms |
| CPTg | Call Progress Tone Audible Ring |
| CPTg500 | Call Progress Tone Audible Ring 500ms |
| CPTm | Call Progress Tone Busy/Reorder Low Tone |
| DTMFall100 | Dual Tone Multiple Frequency all 100ms |
| DTMFall200 | Dual Tone Multiple Frequency all 200ms |
| Non-Voltage Events | |
| Heartbeat Time | heartbeat time condition |
| Timer Time | mer timeout time condition |
| Filter Time | filtered time condition |
| CPT Off | CPTa CPT tone(s) has just finished |
| CPT 350 Hz | CPTb CPT tone 350 Hz |
| CPT Call Waiting | CPTc CPT tone 440 Hz |
| CPT Dial Tone | CPTd CPT tones 350 + 440 Hz |
| CPT Perm Signal | CPTe CPT tone 480 Hz |
| CPT Recall Tone | CPTf CPT tones 350 + 480 Hz |
| CPT Aud Ring On | CPTg CPT tones 440 + 480 Hz |
| CPT 350/440/480 Hz | CPTh CPT tones 350 + 440 + 480 Hz |
| CPT 620 Hz | CPTi CPT tone 620 Hz |
| CPT 350/620 Hz | CPTj CPT tones 350 + 620 Hz |
| CPT Intercept | CPTk CPT tones 440 + 620 Hz |
| CPT 350/440/620 Hz | CPTl CPT tones 350 + 440 + 620 Hz |
| CPT Busy/Reorder | CPTm CPT tones 480 + 620 Hz |
| CPT 350/480/620 | CPTn CPT tones 350 + 480 + 620 Hz |
| CPT 440/480/620 Hz | CPTo CPT tones 440 + 480 + 620 Hz |
| CPT 350/440/480/620 Hz | CPTp CPT tones 350 + 440 + 480 + 620 Hz |
| evDTMF | Dual Tone Multiple Frequency event conditions |
| DTMF 1 | DTMF digit one 697 + 1209 Hz |
| DTMF 4 | DTMF digit four 770 + 1209 Hz |
| DTMF 7 | DTMF digit seven 852 + 1209 Hz |
| DTMF * | DTMF symbol * 941 + 1209 Hz |
| DTMF 2 | DTMF digit two 697 + 1336 Hz |
| DTMF 5 | DTMF digit five 770 + 1336 Hz |
| DTMF 8 | DTMF digit eight 852 + 1336 Hz |
| DTMF 0 | DTMF digit zero 941 + 1336 Hz |
| DTMF 3 | DTMF digit three 697 + 1477 Hz |
| DTMF 6 | DTMF digit six 770 + 1477 Hz |
| DTMF 9 | DTMF digit nine 852 + 1477 Hz |
| DTMF # | DTMF symbol # 941 + 1477 Hz |
| DTMF A | DTMF character A 697 + 1633 Hz |
| DTMF B | DTMF character B 770 + 1633 Hz |
| DTMF C | DTMF character C 852 + 1633 Hz |
| DTMF D | DTMF character D 941 + 1633 Hz |
| DTMF Off | DTMF tone(s) has just finished |
| evMF | Multiple Frequency event conditions |
| MF off | MF tone(s) just finished |
| MF 1 | MF digit one 700 + 900 Hz |
| MF 2 | MF digit two 700 + 1100 Hz |
| MF 4 | MF symbol four 700 + 1300 Hz |
| MF 7 | MF digit seven 700 + 1500 Hz |
| MF st3p | MF indicator ST3P 700 + 1700 Hz |
| MF 3 | MF digit three 900 + 1100 Hz |
| MF 5 | MF digit five 900 + 1300 Hz |
| MF 8 | MF digit eight 900 + 1500 Hz |
| MF stp | MF indicator STP 900 + 1700 Hz |
| MF 6 | MF digit six 1100 + 1300 Hz |
| MF 9 | MF digit nine 1100 + 1500 Hz |
| MF kp | MF indicator KP 1100 + 1700 Hz |
| MF 0 | MF digit 0 1100 + 1500 Hz |
| MF st2p | MF indicator ST2P 1300 + 1700 Hz |
| MF st | MF indicator ST 1500 + 1700 Hz |
| evRng | Ringing event conditions |
| Machine Ring Off | Ringing has just finished |
| Machine Ring On | Ringing is in progress |
| ecSIT | Special Information Tone event conditions |
| SIT off | SIT tone has just finished |
| SIT s1lS | SIT tone segment 1 low short duration (s1 lS) |
| SIT s1hS | SIT tone segment 1 high short duration (s1 hS) |
| SIT s2lS | SIT tone segment 2 low short duration (s2 lS) |
| SIT s2hS | SIT tone segment 2 high short duration (s2 hS) |
| SIT s3lS | SIT tone segment 3 low short duration (s3 lS) |
| SIT s3hS | SIT tone segment high short duration (s3 hS) |
| SIT nst1 | no SIT tone 1 |
| SIT nst2 | no SIT tone 2 |
| SIT s1hL | SIT tone segment 1 low long duration (s1 hL) |
| SIT s1lL | SIT tone segment 1 high long duration (s1 lL) |
| SIT s2lL | SIT tone segment 2 low long duration (s2 lL) |
| SIT s2hL | SIT tone segment 2 high long duration (s2 hL) |
| SIT s3lL | SIT tone segment 3 low long duration (s3 lL) |
| SIT s3hL | SIT tone segment 3 high long duration (s3 hL) |
| SIT nst3 | no SIT tone 3 |
| evSUOfl | line circuit sensor offline conditions |
| SU Offline | the line circuit sensor has gone offline |
| evSUTrblBtn | line circuit sensor trouble button conditions |
| SU Mark Event In | SU trouble button is being pressed |
| SU Mark Event Out | SU trouble button just released |

DETAILED DESCRIPTION

The system of the present invention provides an effective method for monitoring calls and determining the status of calls for a variety of telephony environments. In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

FIG. 1 illustrates the test system of the present invention connected to a number of different environments. Referring to FIG. 1, the test system can monitor that status of calls originating and terminating at a variety of devices. For example, the test system, referred to herein as a communication signal processor (CSP) can be connected to monitor a simple telephony environment such as a call which exists between the central office (CO) 100 and a residence 102. The CSP can also be connected to a more complex environment such as a business having a private branch exchange (PBX) 104.

The system passively monitors the protocol between two or more network elements in a circuit. This is different from prior art devices that are active elements of the circuit and therefore requiring that a portion of the protocol created relates to the functioning of the network element performing the monitoring. The system of the present invention provides detailed analysis of the progress of the call by monitoring signals originating from more than one network element.

In the present embodiment, the CSP is connected to network switched circuits that contain raw call progress signaling information indicative of the progress of a call. The type of raw call progress signaling information is dependent upon the environment monitored. For example, the sensors may provide physical events (DC/AC voltage and current changes, tones, etc.), call setup messages (ISDN D-Channel messages, CCS7-ISUP messages, etc.) or digital carrier signaling bits (T1/E1 A&B signaling bits). Thus, for example, if the sensor provides physical event information, it may provide a voltage transition from 48 volts (ring conductor to ground) to 36 volts (ring conductor to ground) which is indicative of an off hook event, or a voltage transition from 36 volts (ring conductor to ground) to 48 volts (ring conductor to ground) which is indicative of an on hook event, or a dual frequency detection of 770 Hz and 1336 Hz which is indicative of a DTMF (dual tone multiple frequency) Digit 5 On event.

The CSP tracks the number of calls generated over the monitored circuit and captures all raw call progress signaling information that occurs between the origination and termination of each call. This device can be placed in the serving Central Office (CO) 100 and/or subscriber locations such as residence 102 and factory 105.

As is illustrated in FIG. 1, the CSP can be connected to wide variety of circuits including a local subscriber cable pair 110, Subscriber Line Carrier (SLC) 115, T1/E1 Digital Carrier (CXR) 120, Integrated Services Digital Network (ISDN)/Asynchronous Digital Subscriber Line (ADSL) cable pair 125, CO Trunks 130, Private Communication Service (PCS) Trunks 135, Cellular Telephone 140, or any facility that carriers telephone or telephone like calls. Each sensor of the CSP can be connected intrusively or non intrusively to the circuit. When the sensor is connected non-intrusively, the sensor is half tapped on the circuit via a high resistance. This permits the sensor to be connected while the circuit is in use without affecting the circuit. It is preferable to use this type of connection for data circuits, 911 circuits, and other sensitive type circuits. When the sensor is connected intrusively, the circuit is opened up and taken out of service for a short time in order to connect the sensor. The circuit is connected through the sensor. This connection permits current detection, making it more accurate since current can be used as an additional parameter for analysis. Non intrusive connects cannot detect current.

Using either type of connection, the test system can generate accurate determination as to the current value that is present at any time because the states are monitored so closely.

As will be explained in more detail below, using the raw call progress signaling information, the system processes the detected events and preferably outputs call count and call event information, for example, to an external display system 145.

For example, a CSP 150 is connected to the local cable pairs 155 that feed an Internet Service Provider (ISP) 160. When a call is placed to the ISP on one of the lines, the sensor of the CSP captures the raw call progress signaling information indicative of the occurrence of physical events (130 Volts AC on for 2 seconds, Line Voltage change to 35 Volts DC on the Ring Conductor and 20 Volts DC on the Tip Conductor, Line Voltage Change to 60 Volts DC on the Ring conductor and 0 Volts on the Tip conductor, Line Voltage Change to 48 Volts DC on the Ring conductor). The sensor identifies the voltage change and passes the raw call progress signaling information to the call processor wrapper, where each raw call progress signaling event detected is time stamped and converted to standardized call progress events for subsequent processing by the system. In the present embodiment, examples of call progress events include Machine Ring On, Machine Ring Off, Off Hook, Float and On Hook. The call processor wrapper further calls a timer processor which calculates the elapsed time from the previous call progress event, determines if any other timer(s) previously set by the call progress state machine has expired. These timers are used to determine the wait for an expected call progress event (e.g., dial tone should be detected within 4 seconds after an off hook event is detected) or validate the duration of a call progress event (e.g., DTMF digits should remain on for at least 50 ms to be valid).

The timer processor selects the most recent event in time, e.g., expired timer or call progress event, and clocks the call progress state machine. When clocked, the call progress state machine analyzes the event and current call status indicators, provided by a call status handler located in the call processor wrapper. The call status handler is used to track the current status of the call, e.g., dial tone received, the call is an originating call, circuit is off hook, etc. The call progress state machine either transitions to a new state or remains in the current state. If it transitions to a new state, the call progress state machine updates the call status handler with the new status information, updates a state tracker processor of the wrapper with the new state and informs the timer processor that state machine has completed the current cycle. If the call progress state machine did not transition to a new state, it informs the timer processor that it has completed the current cycle without altering the contents of the call status handler of state tracker. This process is performed for the call progress event and each expired timer identified by the timer processor. The call processor wrapper and the call progress state machine then wait for the next event to occur.

The states indicative of progression of the call are maintained for further analysis and reference. The information maintained is useful to test/maintenance personnel for analysis of the sensed circuit. For example, when the call progress state machine determines that the call has terminated, the information maintained may be, for example, one Terminating Call having no unusual events and having corresponding call progress events circuit Idle, Machine Ring On, Machine Ring Off, Machine Ring On, Machine Ring Off, Station Off Hook, Stable Call, Station On Hook, CO On Hook.

The state machine also determines unusual call events. For example, if a caller on the monitored line abandons the call before it is answered, the output of the state machine will be: One Terminating Call; One Unusual Event—Caller Abandon, and the following events: Idle, Machine Ring On, Machine Ring Off, CO On Hook.

Features such as described above allow maintenance personnel responsible for call processing to identify potentially bad switched network circuits and correct them before subscriber trouble reports are generated.

Figure 2:
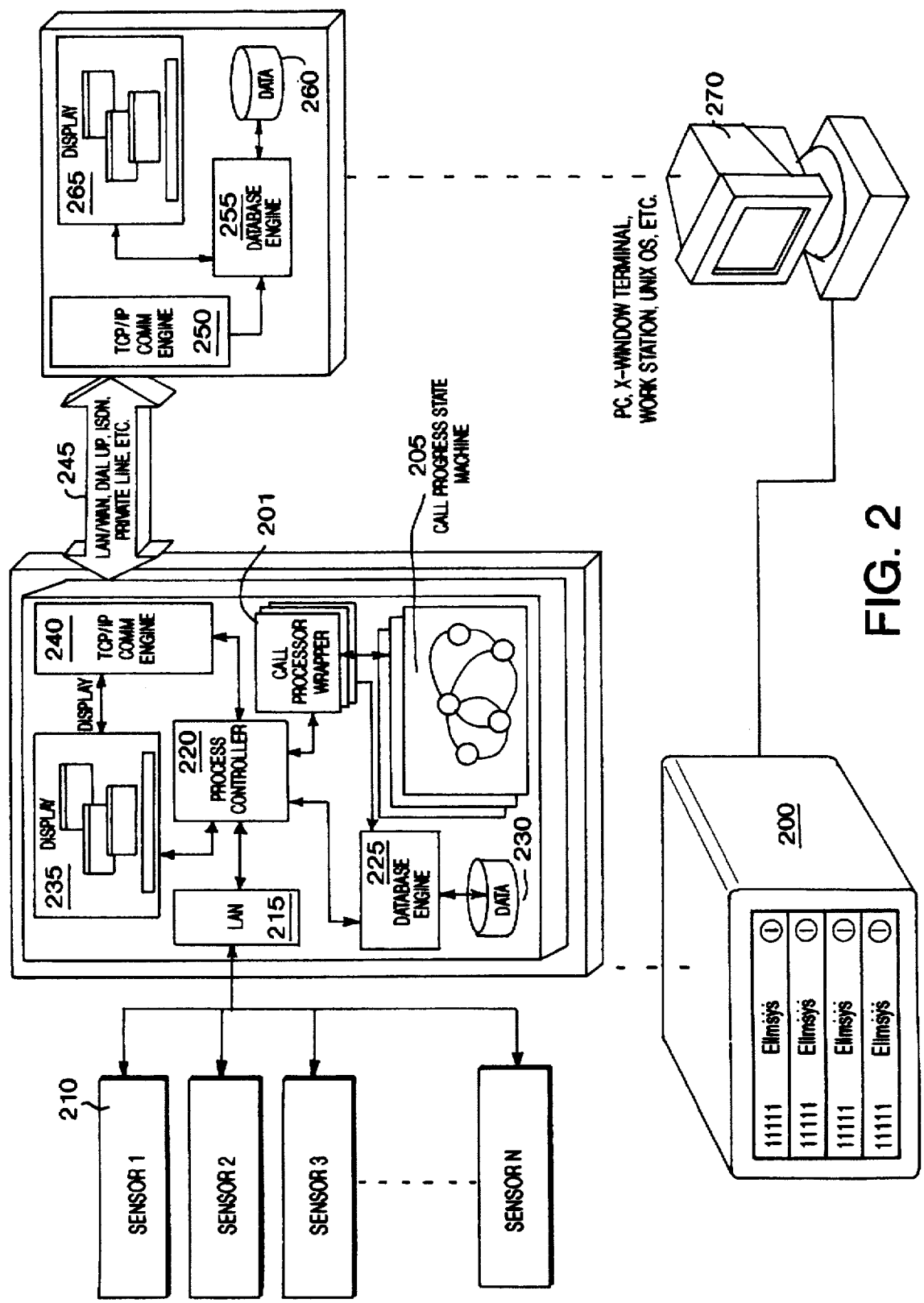
FIG. 2 is a simplified block diagram illustrating one configuration of the test system of the present invention coupled to sensors and remote devices.

FIG. 2 illustrates one embodiment of the system of the present invention. Device 200 captures raw call progress signaling information, indicative of progress of a call, detected on the monitored line. The sensors 210 are connected to switched network circuits coupled to the line to be monitored. The raw call progress signaling information is encoded into a data message and sent to a data communication device such as local area network (LAN) 215 where it is decoded and passed to an appropriate Call Processor Wrapper 201 via a Process Controller 220. Preferably a Call Processor Wrapper 201 and associated Call Progress State Machine 205 is created for each switched network circuit connected to the system 200. The Call Processor Wrapper 201 receives the physical event data located in the decoded message and generates call progress event information and expired timer information and clocks for input to the call progress state machine 205. The call progress state machine 205 determines the state the call has transitioned to based on the new event information and timer information and reports the state change, if any, back to the call processor wrapper. The call processor wrapper 201 updates call status, for example, either updates a local display 235 or a remote display 265, via a communication device 245 and 250, with the new call status. The state information can be output a variety of ways including displaying the results locally or on a remote display. In addition, the state information can be output to a database for archive purposes. Preferably, once a completed call is detected by the call progress state machine 205, the call progress wrapper 201 creates a call record containing event information and corresponding call states. The call record is passed to a database engine device 225 via the process controller device 220 which archives the call record in a database 230.

The archive of calls may be later accessed for a variety of analysis. For example, if a user wishes to retrieve archived call records, a remote terminal 270 could access the system via a communication device 250 and 245 and down load the call record database to a remote database engine 255 which saves the call records to a local database 260. The user can then browse the call record data base as needed. This permits the user to review the switched network circuit(s) usage patterns and call processing performance. If an anomaly is detected, corrective action can taken to eliminate any potential service problems.

An example of information transferred is illustrated in FIGS. 3a, 3b and 3c. FIG. 3a illustrates the raw call processing signal information sent by the sensor to the wrapper. This information includes an identification of the type of message (e.g., voltage message), a time stamp, detailed portion of the message (in the present example, voltage information, e.g., tip to ground, ring to ground, tip to ring and current), and circuit ID. The wrapper determines the corresponding event and forwards it to the call processor state machine. FIG. 3b illustrates the corresponding events for the received raw call processing signal information. Preferably, the wrapper forwards each event to the state machine, along with the type of message and date-time stamp. The state machine determines the corresponding state. FIG. 3c illustrates the states determined from the corresponding events. The system preferably provides some analysis regarding the call. With respect to the above illustration, for example, the following analysis are provided by the system and stored in the call status module for subsequent output:

Call=terminating (since the machine ringing was detected—if the call was an originating call, a dial tone would have been detected)

No Unusual Events (the state machine did not detect any anomalous events)

Physical Events=Idle, Machine Ring On=2, Machine Ring Off=2, Station Off Hook (answer), Stable Call, Station On Hook, CO On Hook.

Figure 4:
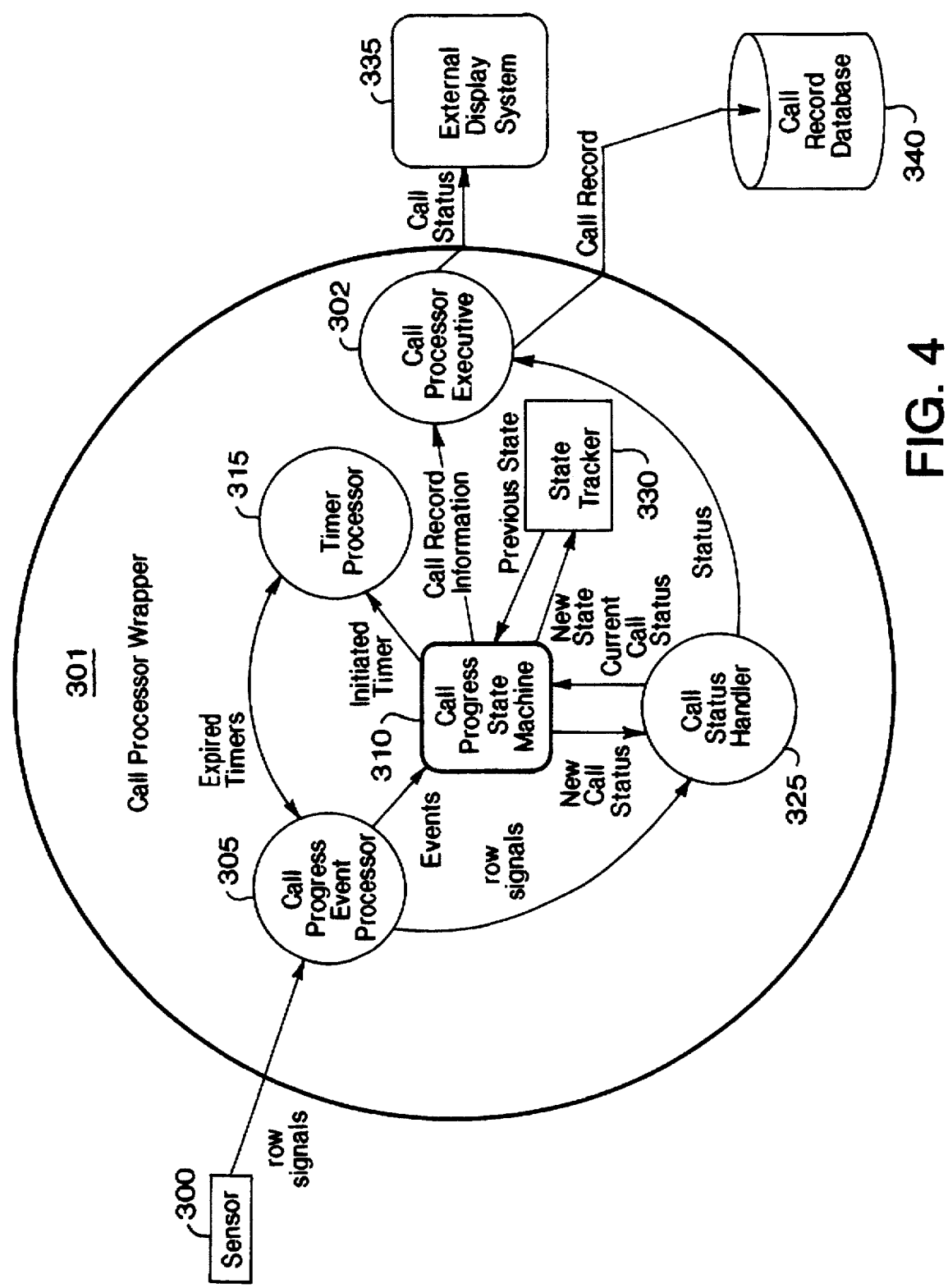
FIG. 4 illustrates one embodiment of the call progress wrapper and call progress state machine.

FIG. 4 illustrates the operation of the Call Processor Wrapper and Call Progress State Machine. The call processor wrapper 301 includes a call progress event processor module 305,. call status handler module 325, state tracker module 330, timer processor module 315 and call processor executive module 302. During the progress of a call, the call status handler module 325 maintains a record status of the call, including the state of the call and all raw call progress signals, for each physical event received.

When raw call progress signal information is passed from the sensor 300 to the call processor wrapper 301, the call progress event processor 305 translates the raw call progress signal information into physical event information (e.g., On Hook, Off Hook, Audible Ringing On, Dial Tone On, Dial Tone Off, etc.) and passes the delta time (the elapsed time between physical events) elapsed timing events and physical event information to the call progress state machine 310. Preferably, the call progress event processor sends events (timing events received from the timer processor module 315 and physical events received from the sensor 300) one at a time for processing by the call progress state machine 310. Preferably, the timing events are sent first, the last event sent being the physical event. It should be realized that during the processing of an event additional events can be generated that require processing by the call progress state machine. For example, a time-out could occur, causing a timing event to be generated. Alternately, the processing of timing or physical events by the call progress state machine can cause the initiation of additional timers which may time-out causing additional timing events to be generated and processed by the call progress state machine 310.

The call progress state machine 310 retrieves the previous call state information from the state tracker 330 module and determines if the new physical event and current call status information (call status information includes the number or digits, type of call, any abnormalities or troubles in the call, call dispositions, busy, how many rings, how many calls there has been, on hook/off hook, etc.) obtained from the call status handler module 325 and/or any expired timer information obtained from the timer processor module 315 indicates a transition to a new call state. If the call progress state machine 310 does not receive enough information to cause a transition to a new state, it will stay in its current state until a new event is presented to it.

If a new state is identified, the call progress state machine clocks itself to move to the new state. Once transitioned to the new state, the call progress state machine 310 updates the state tracker module 330 with the new state information and the call status handler 325 with new call status information. If new timers are to be enabled as a result of transitioning to the new state, the call progress state machine updates the wrapper's timer processor 315 with the timer information to enable specified timers. Preferably two types of timers are used: dependent and independent. Dependent timers are dependent upon the state and disabled when the state is exited. Independent timers are independent of state and remain enabled through state transitions.

Preferably the call processor executive module receives call information which can include the new call state information and call status information. This information is translated and transmitted to an external display system 335 for display of the new call state and status.

If the call progress state machine 310 determines that the new state indicates that the call has been terminated or abandoned, the state machine inform the call processor executive 302 and call status handler 325 that the current call has terminated. The call status handler 325 forwards call status information to the call processor executive 302 will then creates a call record for output to the call record database 340.

The structure of the system permits determination of the final status of the call, e.g., abandoned, dial tone delay, improper digits, etc. Table 1 illustrates the events that occurred during a call that was subsequently abandoned.

in the art, this is exemplary and can be extended to a variety of states for a variety of telephony configurations. In this example, the call progress state machine is in the StIdle State (i.e., circuit idle state) 415. A new physical event—bStsOffHook 401 (off hook) is detected by the sensors and passed to the call progress state machine. This causes a transition from the StIdle State 415 to a StSz State 405 (Circuit Seized). The call progress state machine then performs the following functions:

1. Sends a signal to the timer processor module to initiate a timer bTmrsSdDTdly4k (Timer for the receipt of Dial Tone);
2. Sets a status variable in the call status handler, bStssOrg, indicating the call is an originating call;
3. Sets a call disposition variable in the call status handler, bCdOrg, indicating the call disposition at this time is originating call;
4. Sets a notable state variable in the call status handler, bNsOfh, indicating the state of the call is Off Hook;
5. Sets an event filter variable in the call progress event processor, bEvpCPTall, indicating that all Call Progress Tones (CPT) detection should be active;

| Message | Physical Event | | Call Progress Event | State Machine |
| --- | --- | --- | --- | --- |
| Voltage Msg 1 | 0000.000 | ,0,48,48,0,1,<CR> = | On Hook | Idle |
| Voltage Msg 2 | 0320.000 | ,0,48,105,0,1,>CR> = | Machine Ring On | Ring On |
| Voltage Msg 3 | 0322.000,0,48,48,0,1 | <CR> = | Machine Ring Off | Ring Off |
| Voltage Msg 4 | 0326.000 | ,0,48,105a,0,1 <CR> = | Machine Ring On | Ring On |
| Voltage Msg 5 | 0328.000,0,48,48,0,1 | <CR> = | Machine Ring Off | Ring Off |
| Voltage Msg 6 | 1565.100 | ,0,60,60,0,1 <CR> = | Float | Station on Hook |
| Voltage Msg 7 | 1573.,235 | ,0,48,48,0,1 <CR> = | On Hook | CO On Hook |

In this example, as the station never went off-hook, the call was not answered. Since the ringing stopped after only two rings were detected, the state machine assumes the caller hung up. Therefore, the state machine sets call status bits indicative of the following;
Call=terminating
Unusual Events=1 abandoned call
Physical Events=Idle, Machine Ring On=2, Machine Ring Off=2, Station On Hook, CO On Hook.

The call progress event processor and timer processor can filter out events from reaching the call progress state machine. The state machine has the capability to initiate filter functions. Preferably these filter functions are maintained through the states unless disabled or changed by the state machine. For example, the state machine can issue a signal to filter out a certain event unless it is on for a predetermined amount of time. Thus, when the raw signal is detected by the sensor, the corresponding physical event is not passed to the state machine unless the signal is on for the predetermined amount of time as timed by the timer processor. Similarly, the signal can be filtered if not of a short enough duration. The filter functions can filter out a wide variety of events based upon a variety of criteria. For example, certain types of events (e.g., DTMF signals) can be filtered out altogether. The type of filter functions described above are exemplary; it is readily apparent to one skilled in the art that other filter functions can be implemented. In addition, the filter function may function by filtering out the raw call progress signaling information at the call progress event processor 305; alternately, the filter function can operate by disabling the sensing of particular raw progress signals at the sensor 300.

Figure 5:
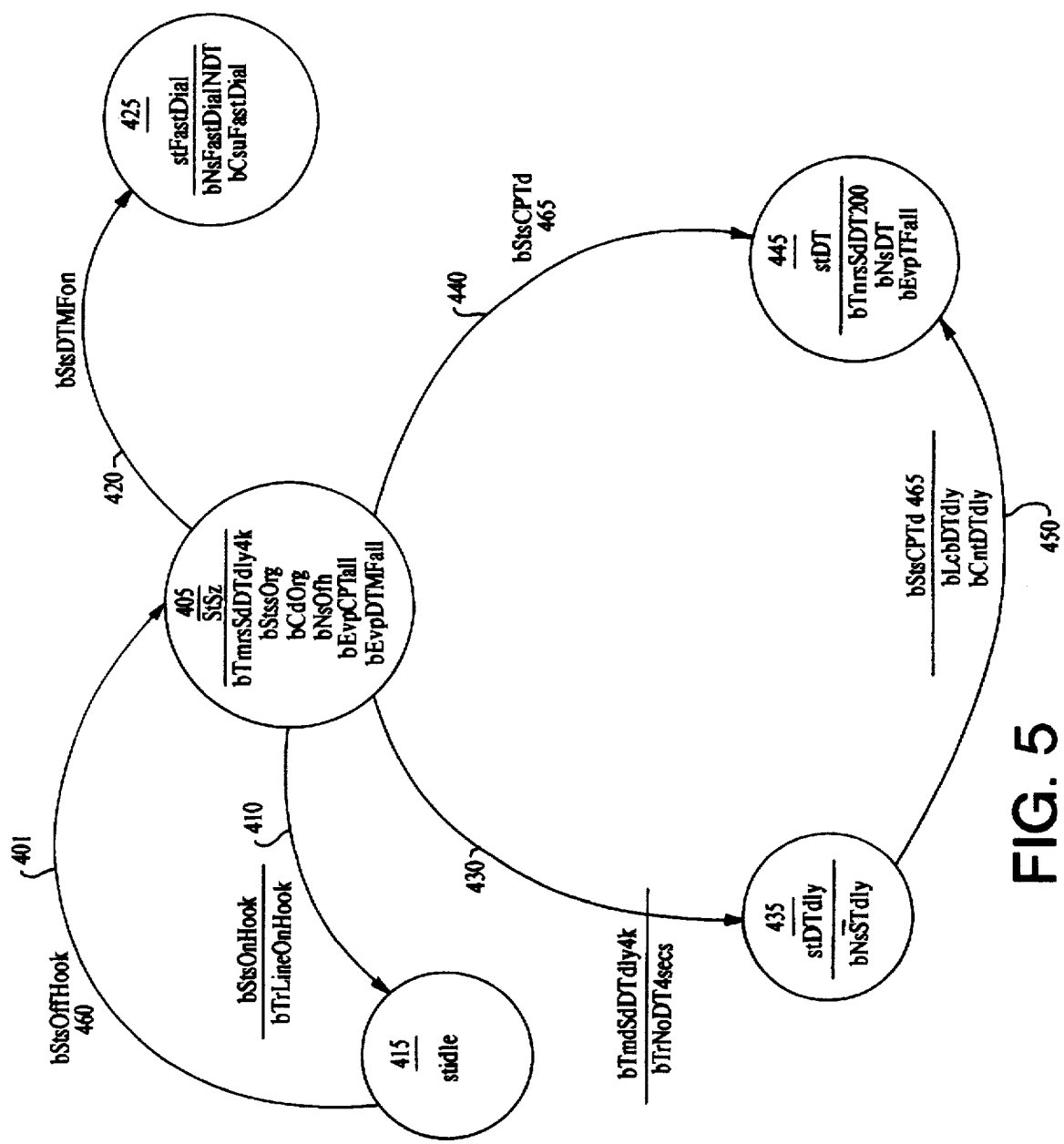
FIG. 5 is a simplified state diagram illustrating the function of the call progress state machine of FIG. 4.
Figure 6A:
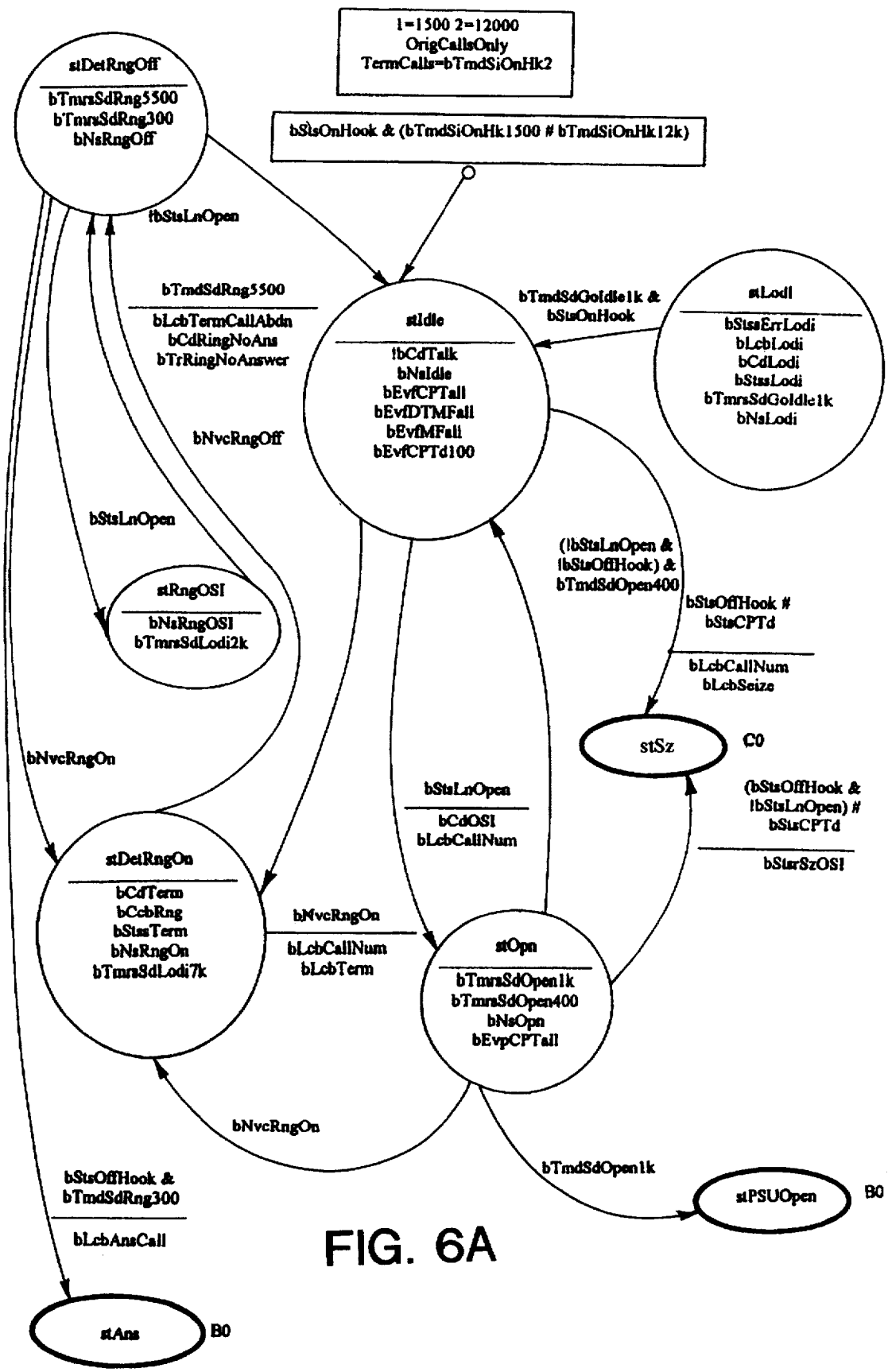
FIGS. 6a, 6b, 6c, 6d, 6e, 6f, 6g, 6h, 6i, 6j, and 6k are state diagrams illustrating the function of the call progress state machine for a loop start circuit.
Figure 6B:
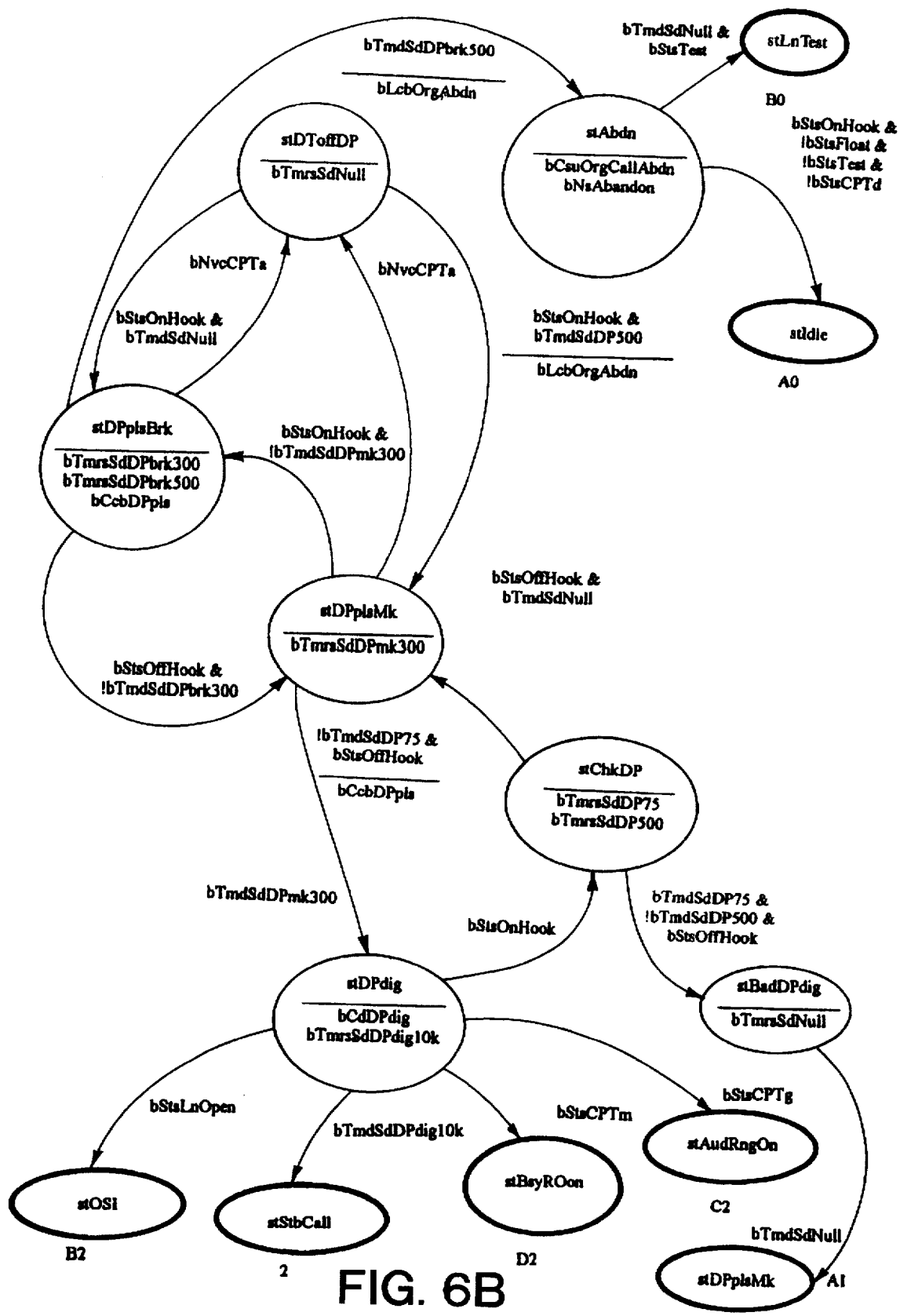
Figure 6C:
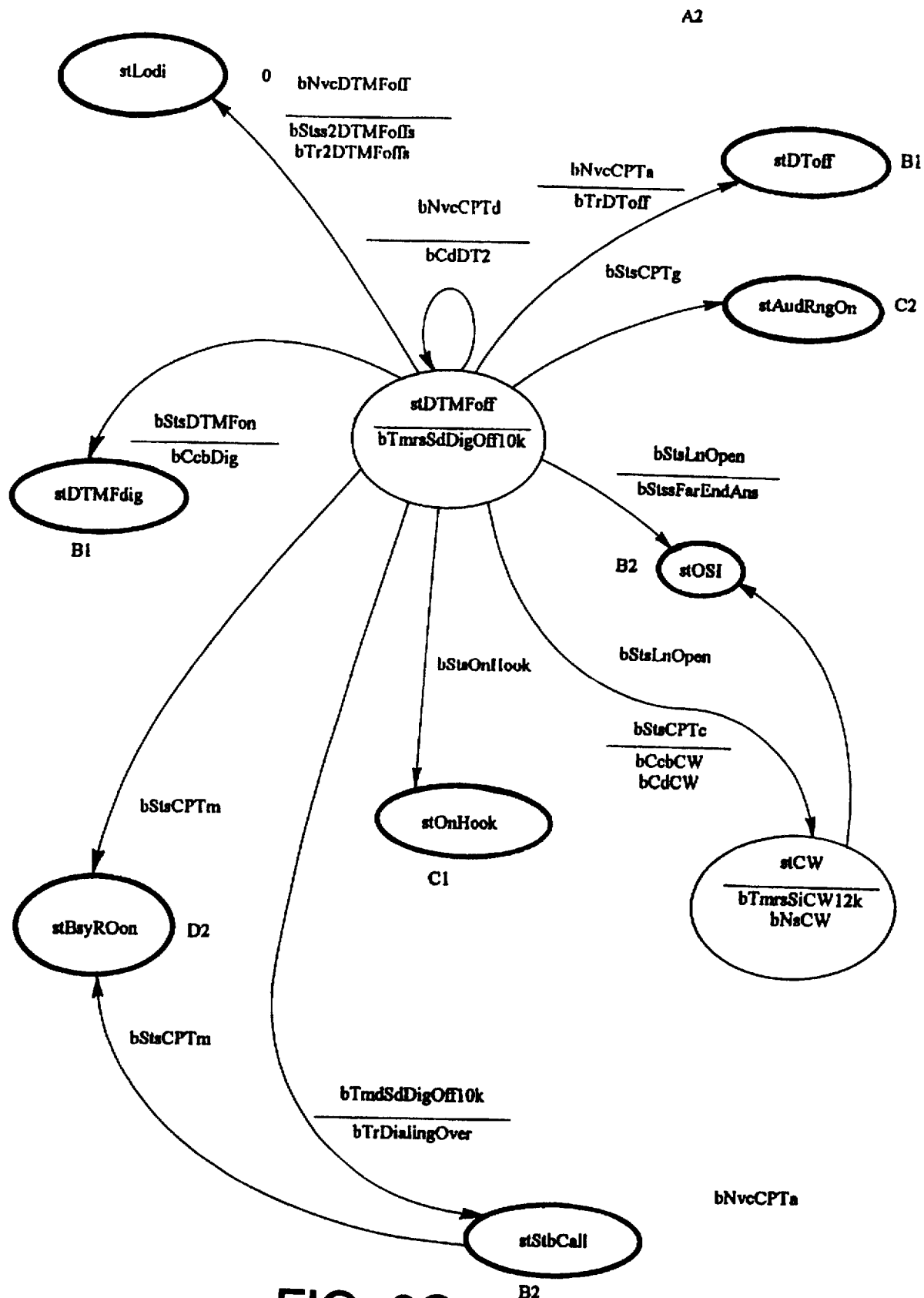
Figure 6D:
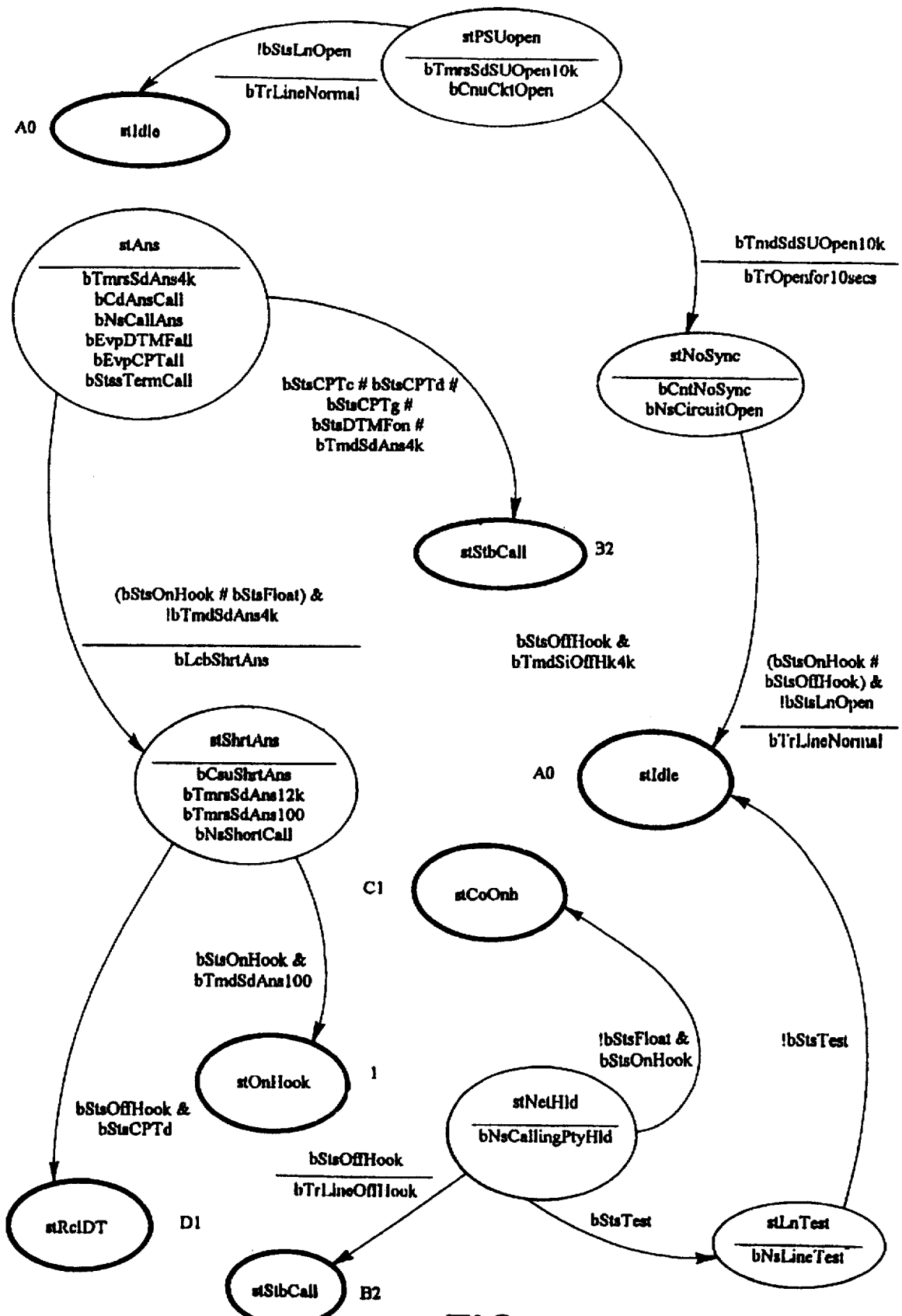
Figure 6E:
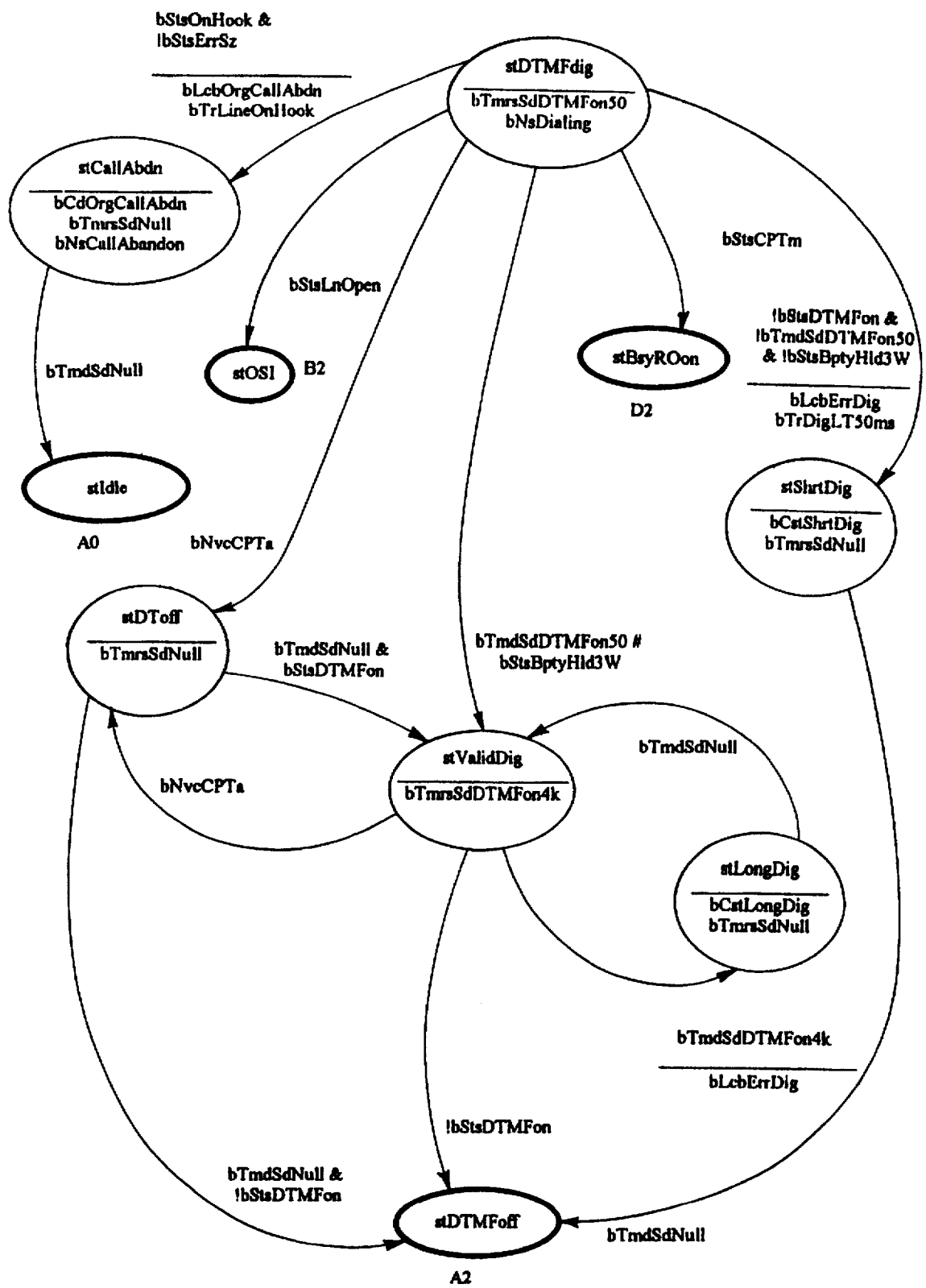
Figure 6F:
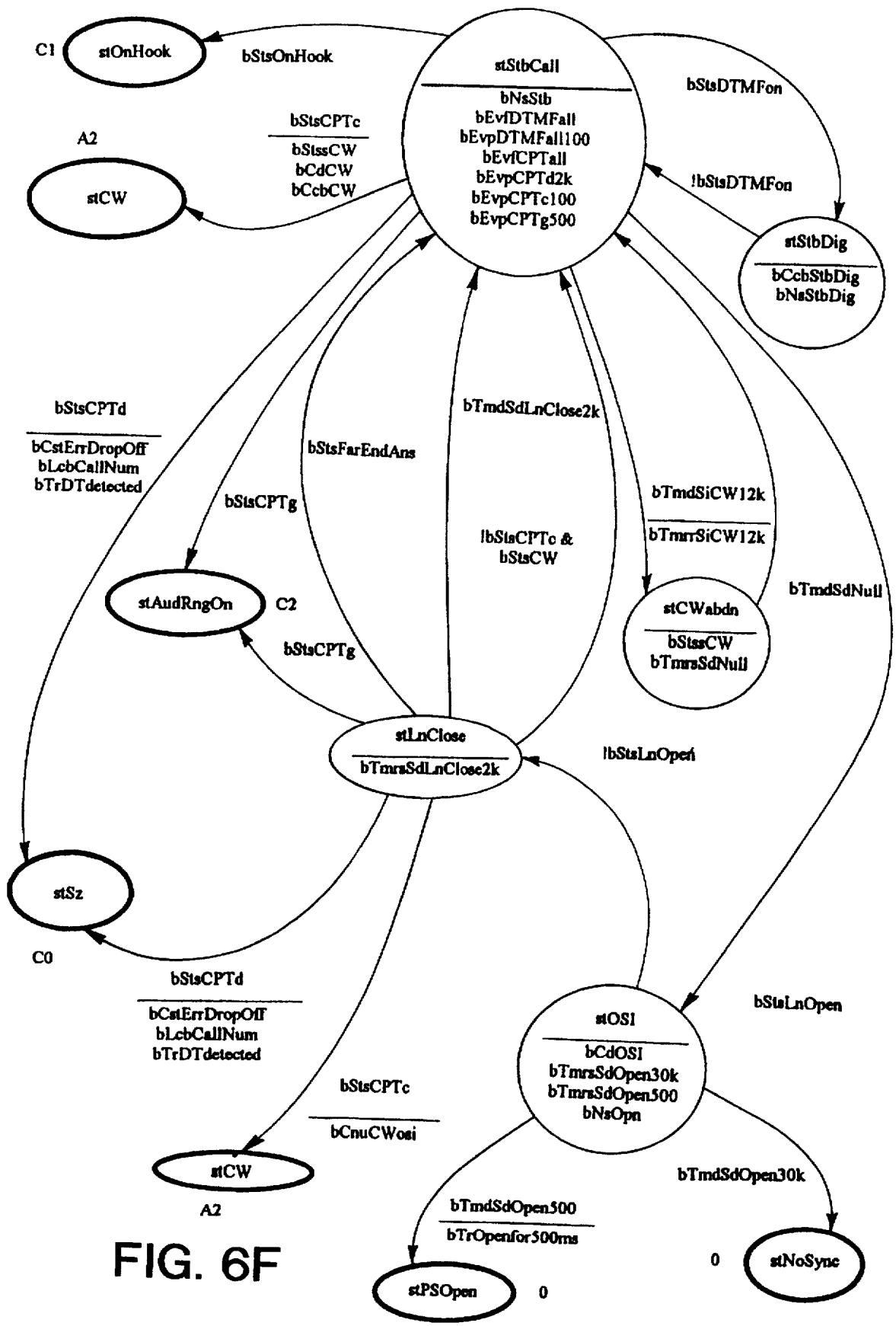
Figures 1, 6G:
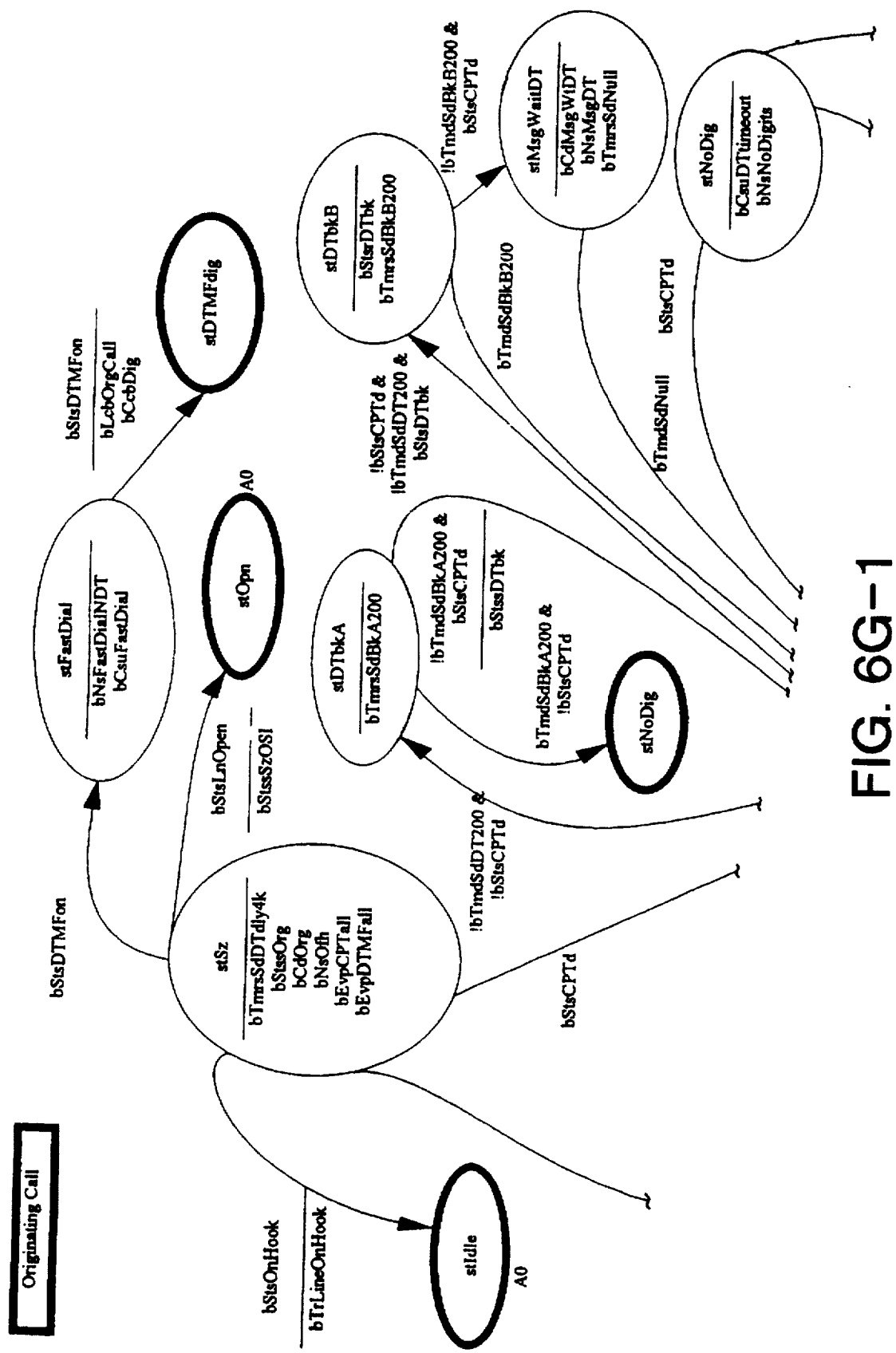
Figures 2, 6G:
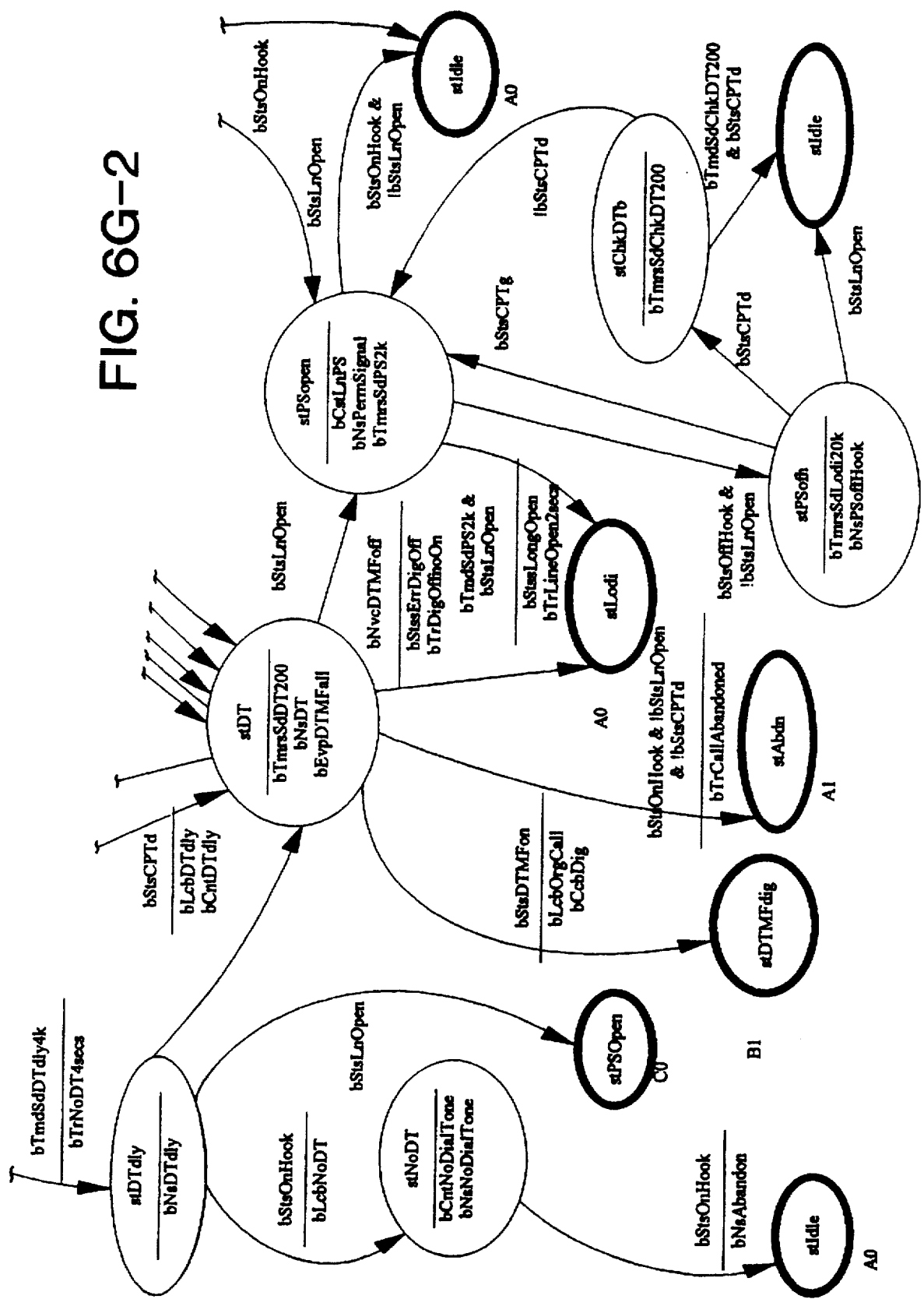
Figures 1, 6H:
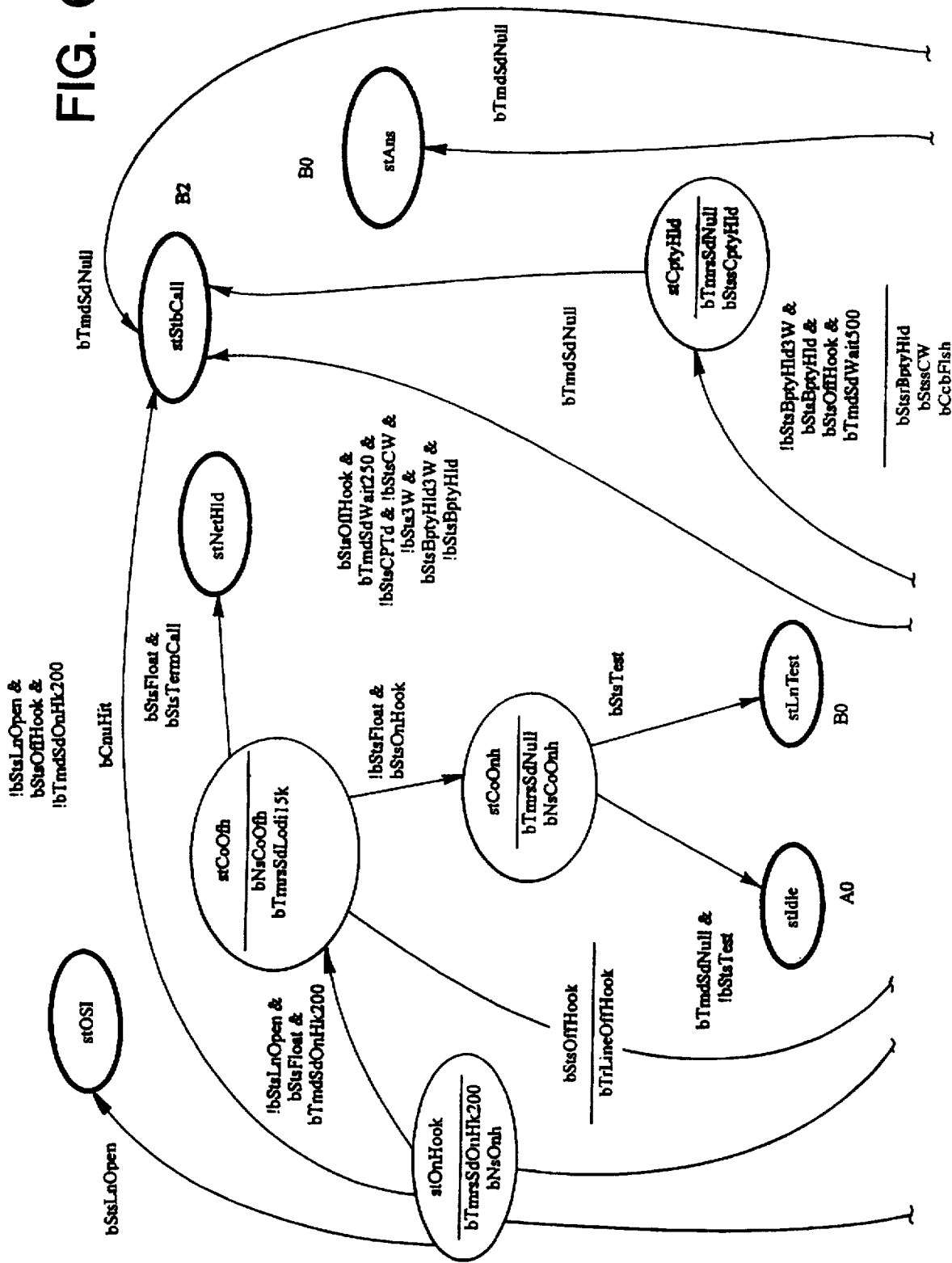
Figures 2, 6H:
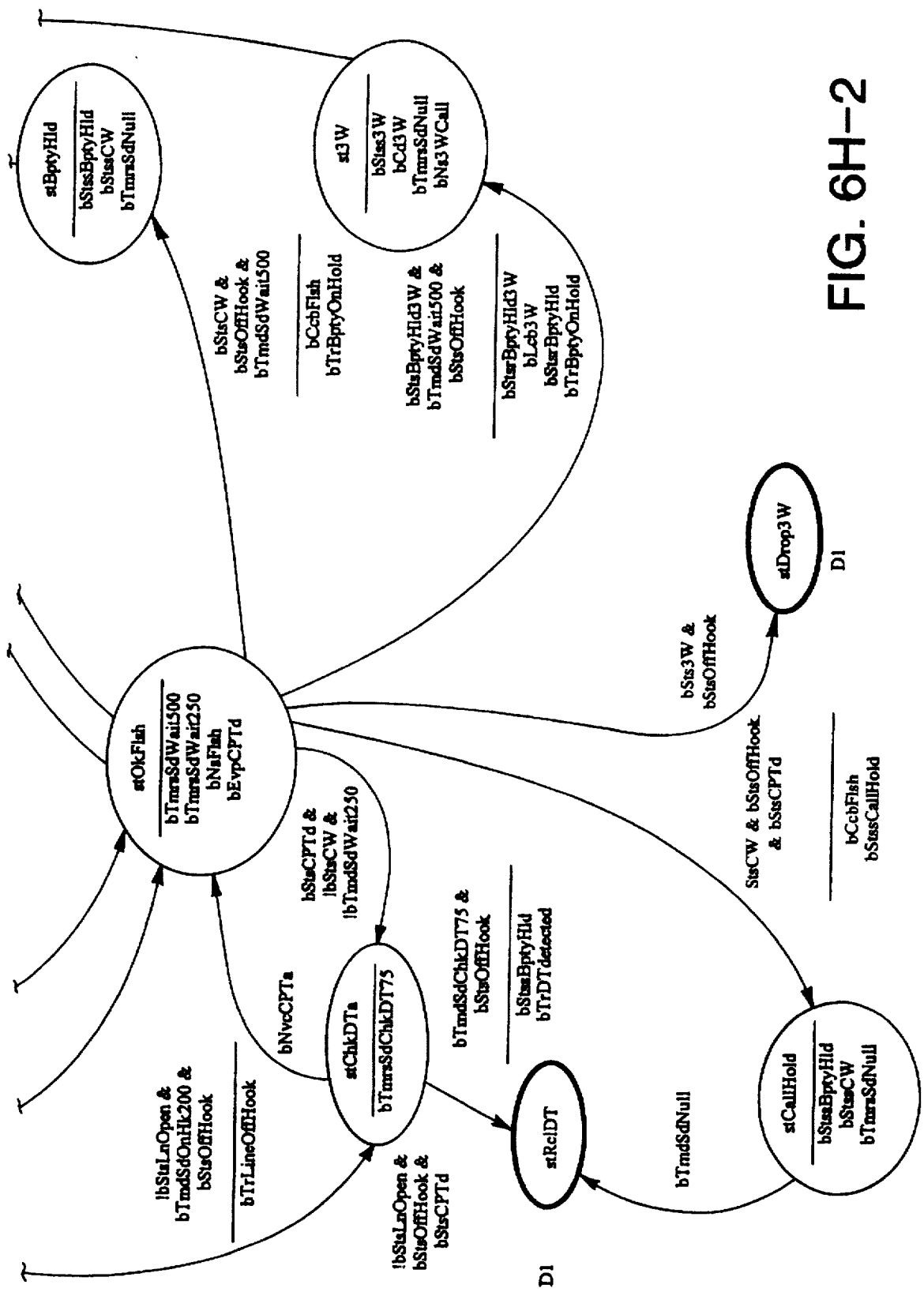
Figure 6I:
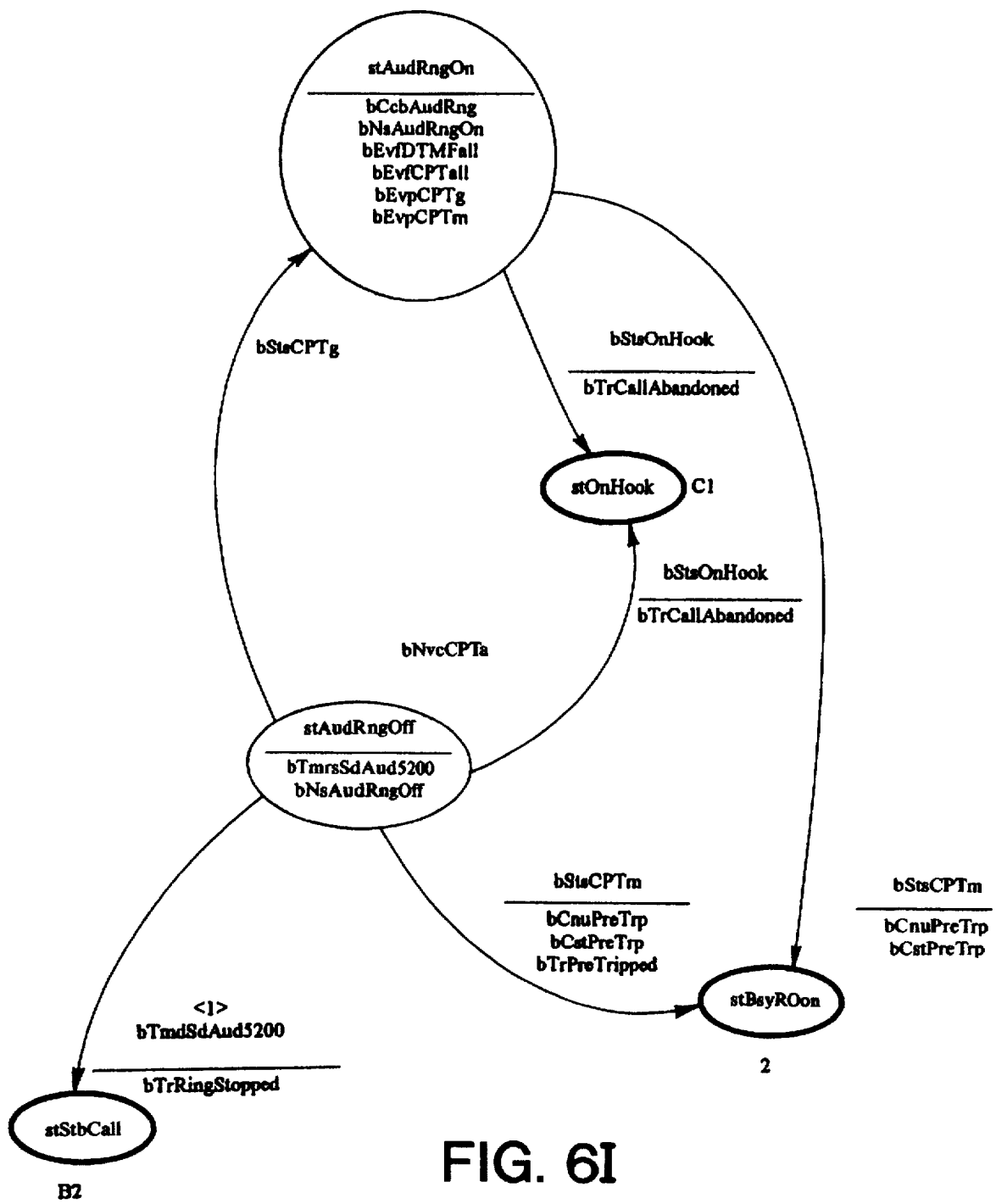
Figure 6J:
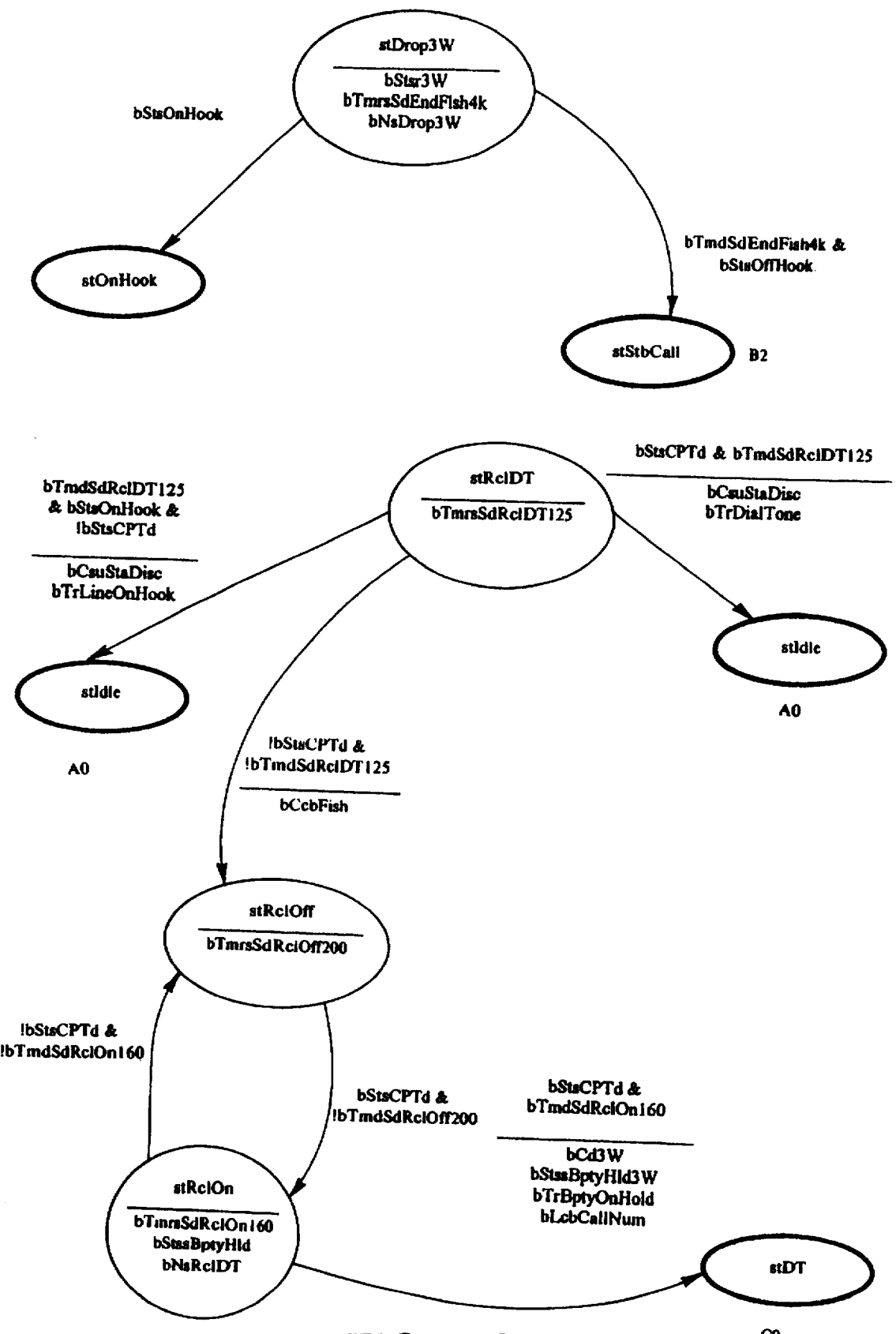
Figure 6K:
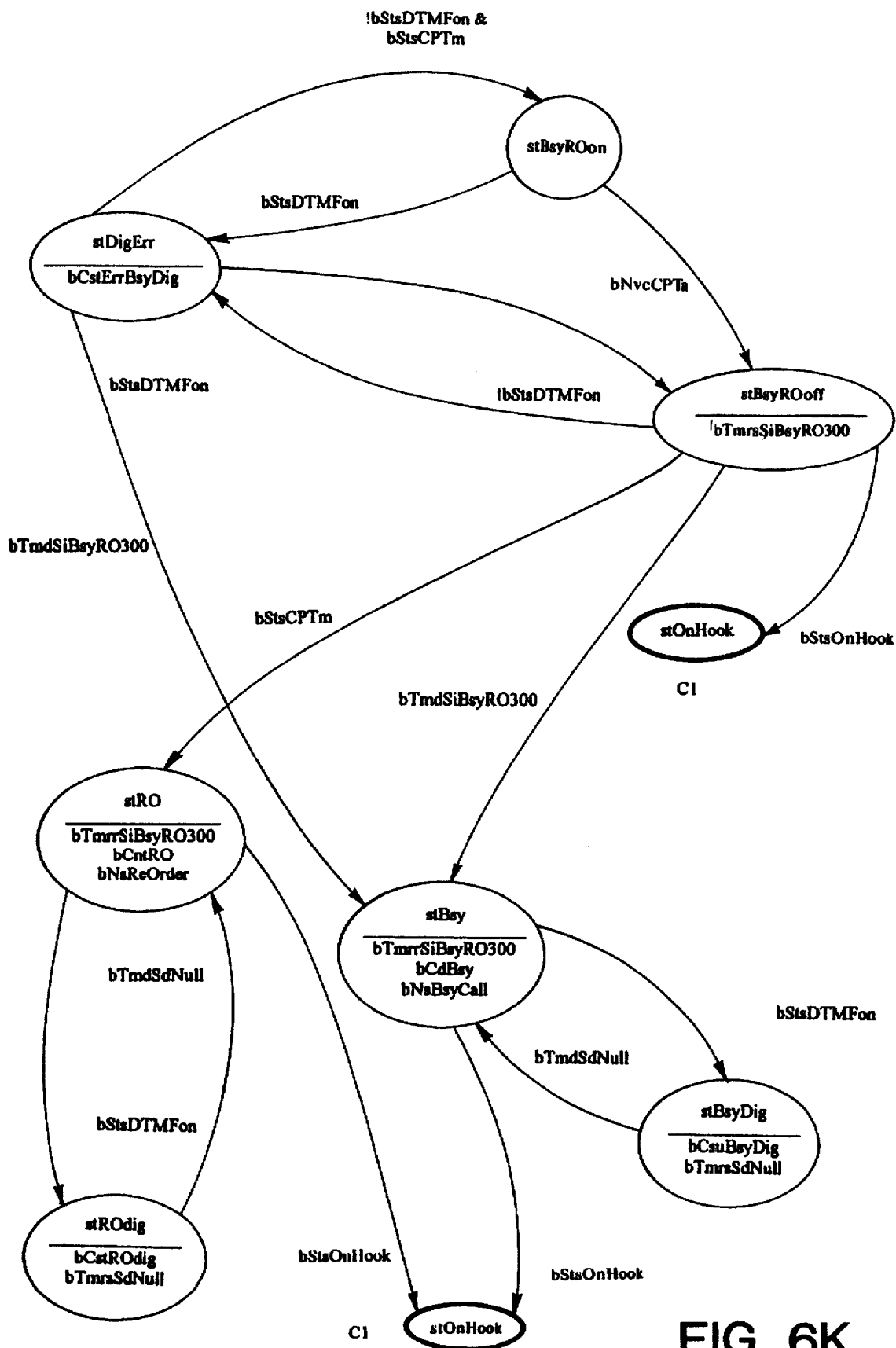

FIG. 5 illustrate an exemplary section of a typical call progress state machine. As is readily apparent to one skilled 6. Sets a second event filter variable in the call progress event processor, bEvpDTMFall, indicating that all Dual Tone Multi-Frequency (DTMF) tone detection should be active
7. Passes an identification (ID) of the new state to the wrapper's state tracker module indicating that the new state of the call (Progress Call State) is stSz, making the previous call state equal to StIdle.

The transition to a new state can cause the initiation of timers in the timer processor. Continuing with the present example, if the next physical event is bStsCPTd 450 (Dial Tone on), the call progress state machine calls the timer Processor, bTmrsSdDTdly4k, to initiate a dial tone timer to track the time for detection of dial tones and provide time out information if a dial tone is not initiated within a specified period of time.

At completion of determining the new state based upon a singular event information received, The call progress state machine sleeps until the next event is presented to it by the call progress event processor.

Continuing reference to FIG. 5, the function of the timer processor will be discussed. In this example, the time delta is calculated between the receipt of the bStsOffHook (event 460 FIG. 5) and the time of the current event bStsCPTd (event 465 FIG. 5). When the off-hook event 460 occurs, the StSz state 405 is entered. At this state, the delay timer, bTmrsSdDTdly4k, is initiated. When a new event is identified (e.g., dial tone, bStsCPTd 465)the call progress event processor notifies the timer processor of the time delta. The timer processor compares the time delta to the initiated timers to determine if any timers have expired. In the present example, the dial tone delay timer, bTmrsSdDTdly4k, expired. The timer processor therefore issues a message to the call progress event processor which clocks the call progress state machine, passing the expired timer variable, bTmdSdDTdly4k. The call progress state machine transitions 430 to a new state, StDTdly 435. Control is then passed back to the call progress event processor which then asks the timer processor if any other expired timers have occurred. If other expired timers have not been processed by the call progress state machine, these are forwarded one at a time, preferably the shortest timer first, to the call progress state machine for processing. Once all expired timers have been processed, the call progress event processor forwards the physical eventbStsCPTd 465 to the call progress state machine (transition 450).

If, upon entering state StSz 405 no timers have expired, the call progress event processor forwards the physical event bStsCPTd 465 to the call progress state machine (transistions 440). Another event causing a transition from at StSz state 405 is bStsDTMFon (non voltage event DTMF on) 420. This event causes a transition to stFastDial (fast dial state) 425. In this state, the bNsFastDialNDT (notable state, fast dial, no dial tone) variable and the bCsuFastDial (call status unusual, fast dial) are set.

FIG. 5 provides a simplified example of one portion of the call progress state machine. FIGS. 6a–6k provides more detailed state diagrams of the operation of the call progress state machine for a loop start line. As is readily apparent, FIGS. 6a–6k provides the logic for one type of circuit; it is obvious to one skilled in the art, that the logic could be modified to provide accurate protocol analysis for different types of circuits.

Though a state machine can be developed to define the call progress protocol used by switch network elements, it does not provide the ability to save status information in memory nor is it capable of tracking and processing timers. Typically these functions would be performed by external hardware that is not available to normal processors or would be very cumbersome and expensive to add to normal processor mother boards. Hardware timers would also be difficult to modify as additional call progress protocol procedures are introduced by network switch vendors. Therefore, it is preferable that the call processor wrapper performs these functions using C++ Objects which can be easily updated and maintained. Thus each module would be an object instantiated for each circuit monitored. Alternately, the system can be embodied as different processes executed by one or more processors.

Though an embodiment of the call progress state machine and its associated call processor wrapper is discussed in detail above, other methods such as data flow diagramming tools, expert system tools such as CLIPS tools, LISP programming language, Siefuzzy fuzzy logic tools, etc.

What is claimed is:

1. A system for monitoring the progress of a call comprising:

a sensor for sensing raw call progress signaling information on a circuit;

a wrapper coupled to the sensor for receiving the sensed raw call progress signaling information and generating physical events and time events, the wrapper comprising:

a call progress event processor configured to convert the raw call progress signaling information into call progress event indicators.

a timer processor coupled to the call progress event processor configured to calculate an elapsed time from a previous call progress event; and a call progress state machine coupled to the timer processor configured to receive each event and determine a state of the progress of the call on the circuit.

2. The system of claim 1, further comprising:

a call status handler coupled to the call progress state machine configured to maintain a status of a call, including a state of the call and associated raw call progress signals, for each physical event received by the system.

3. The system of claim 2, further comprising:

a state tracker coupled to the call progress state machine configured to track a state occupied by the call progress state machine and state information relating to the state.

4. The system of claim 3, further comprising:

a call processor executive coupled to the call progress state machine and to the call status handler configured to receive call information, including call state information and call status information, translate the information received, and transmit the translated information to a device external to the wrapper.

5. The system of claim 1, wherein the timer processor is further configured to select a most recent event in time and, as a result, clock the call progress state machine.

6. A method in a telephone system for determining and monitoring the status of at least one call comprising the steps of:

sensing a raw call progress signal on a circuit;

in response to the raw call progress signal, generating physical event and time events;

converting the raw call progress signal to a call progress event indicator;

calculating an elapsed time from a previous call progress event;

determining whether at least one timer previously set has expired;

based on the results of calculating and determining, waiting for a predetermined time and validating a duration for an expected call progress event; and selecting a most recent event, and in response, clocking a call progress state machine.

7. The method of claim 6, wherein the most recent event is the expiration of a timer.

8. The method of claim 6, where in the most recent event is a call progress event.

* * * * *

UNITED STATES PATENT AND TRADEMARK OFFICE
CERTIFICATE OF CORRECTION

PATENT NO. : 5,787,164
DATED : July 28, 1998
INVENTOR(S) : Haines et al.

It is certified that error appears in the above-identified patent and that said Letters Patent is hereby corrected as shown below:

In column 18 at line 54 delete "where in" and insert --wherein--

Signed and Sealed this

Fourteenth Day of December, 1999

Attest:

Q. TODD DICKINSON

Attesting Officer

Acting Commissioner of Patents and Trademarks